(12) United States Patent
Cassell et al.

(10) Patent No.: US 7,664,913 B2
(45) Date of Patent: Feb. 16, 2010

(54) QUERY-BASED SPARES MANAGEMENT TECHNIQUE

(75) Inventors: Loellyn J. Cassell, Pleasanton, CA (US); Sunitha S. Sankar, San Jose, CA (US); Scott Schoenthal, San Ramon, CA (US)

(73) Assignee: NetApp, Inc., Sunnyvale, CA (US)

( * ) Notice: Subject to any disclaimer, the term of this patent is extended or adjusted under 35 U.S.C. 154(b) by 321 days.

(21) Appl. No.: 10/394,819

(22) Filed: Mar. 21, 2003

(65) Prior Publication Data

US 2005/0114593 A1    May 26, 2005

(51) Int. Cl.
    G06F 12/02    (2006.01)
(52) U.S. Cl. .................................... 711/114; 711/170
(58) Field of Classification Search ............ None
    See application file for complete search history.

(56) References Cited

U.S. PATENT DOCUMENTS

| | | |
|---|---|---|
| 3,876,978 A | 4/1975 | Bossen et al. |
| 4,092,732 A | 5/1978 | Ouchi |
| 4,201,976 A | 5/1980 | Patel |
| 4,205,324 A | 5/1980 | Patel |
| 4,375,100 A | 2/1983 | Tsuji et al. |
| 4,467,421 A | 8/1984 | White |
| 4,517,663 A | 5/1985 | Imazeki et al. |
| 4,547,882 A | 10/1985 | Tanner |
| 4,667,326 A | 5/1987 | Young et al. |
| 4,688,221 A | 8/1987 | Nakamura et al. |
| 4,722,085 A | 1/1988 | Flora et al. |
| 4,755,978 A | 7/1988 | Takizawa et al. |
| 4,761,785 A | 8/1988 | Clark et al. |
| 4,775,978 A | 10/1988 | Hartness |
| 4,796,260 A | 1/1989 | Schilling et al. |
| 4,817,035 A | 3/1989 | Timsit |
| 4,825,403 A | 4/1989 | Gershenson et al. |
| 4,837,680 A | 6/1989 | Crockett et al. |
| 4,847,842 A | 7/1989 | Schilling |
| 4,849,929 A | 7/1989 | Timsit |
| 4,849,974 A | 7/1989 | Schilling et al. |
| 4,849,976 A | 7/1989 | Schilling et al. |
| 4,870,643 A | 9/1989 | Bultman et al. |
| 4,899,342 A | 2/1990 | Potter et al. |
| 4,989,205 A | 1/1991 | Dunphy, Jr. et al. |
| 4,989,206 A | 1/1991 | Dunphy, Jr. et al. |
| 5,077,736 A | 12/1991 | Dunphy, Jr. et al. |
| 5,088,081 A | 2/1992 | Farr |
| 5,101,492 A | 3/1992 | Schultz et al. |
| 5,128,810 A | 7/1992 | Halford |

(Continued)

FOREIGN PATENT DOCUMENTS

EP    1 324 200 A2    7/2003

(Continued)

OTHER PUBLICATIONS

U.S. Appl. No. 10/027,909, Steven R. Klinkner.

(Continued)

*Primary Examiner*—Gary J Portka
(74) *Attorney, Agent, or Firm*—Cesari and McKenna, LLP

(57) ABSTRACT

A query-based spares management technique enables a storage operating system of a storage system to select disks to be added to one or more RAID groups of a volume. The spares management technique includes an attributes-based disk selection procedure that is performed by the storage operating system in response to an operator-initiated request to add disks to the volume or in response to a demand-driven request resulting from a requirement imposed by the system to add disks to the volume. The disks that are added to the RAID groups of the volume are retrieved from one or more spare pools of disks maintained by the storage system.

85 Claims, 10 Drawing Sheets

U.S. PATENT DOCUMENTS

| | | |
|---|---|---|
| 5,148,432 A | 9/1992 | Gordon et al. |
| RE34,100 E | 10/1992 | Hartness |
| 5,163,131 A | 11/1992 | Row et al. |
| 5,166,936 A | 11/1992 | Ewert et al. |
| 5,179,704 A | 1/1993 | Jibbe et al. |
| 5,202,979 A | 4/1993 | Hillis et al. |
| 5,208,813 A | 5/1993 | Stallmo |
| 5,210,860 A | 5/1993 | Pfeffer et al. |
| 5,218,689 A | 6/1993 | Hotle |
| 5,233,618 A | 8/1993 | Glider et al. |
| 5,235,601 A | 8/1993 | Stallmo et al. |
| 5,237,658 A | 8/1993 | Walker et al. |
| 5,257,367 A | 10/1993 | Goodlander et al. |
| 5,271,012 A | 12/1993 | Blaum et al. |
| 5,274,799 A | 12/1993 | Brant et al. |
| 5,305,326 A | 4/1994 | Solomon et al. |
| 5,351,246 A | 9/1994 | Blaum et al. |
| 5,375,128 A | 12/1994 | Menon et al. |
| 5,410,667 A | 4/1995 | Belsan et al. |
| 5,537,567 A | 7/1996 | Galbraith et al. |
| 5,579,475 A | 11/1996 | Blaum et al. |
| 5,623,595 A | 4/1997 | Bailey |
| 5,657,468 A | 8/1997 | Stallmo et al. |
| 5,758,050 A | 5/1998 | Brady et al. |
| 5,758,118 A | 5/1998 | Choy et al. |
| 5,805,788 A | 9/1998 | Johnson |
| 5,812,753 A | 9/1998 | Chiariotti |
| 5,819,292 A | 10/1998 | Hitz et al. |
| 5,862,158 A | 1/1999 | Baylor et al. |
| 5,884,098 A | 3/1999 | Mason, Jr. |
| 5,948,110 A | 9/1999 | Hitz et al. |
| 5,950,225 A | 9/1999 | Kleiman |
| 5,963,962 A | 10/1999 | Hitz et al. |
| 6,038,570 A | 3/2000 | Hitz et al. |
| 6,092,215 A | 7/2000 | Hodges et al. |
| 6,098,119 A * | 8/2000 | Surugucchi et al. ........... 710/10 |
| 6,138,125 A | 10/2000 | DeMoss |
| 6,138,126 A | 10/2000 | Hitz et al. |
| 6,138,201 A | 10/2000 | Rebalski |
| 6,158,017 A | 12/2000 | Han et al. |
| 6,223,300 B1 | 4/2001 | Gotoh |
| 6,247,157 B1 | 6/2001 | Edirisooriya |
| 6,289,356 B1 | 9/2001 | Hitz et al. |
| 6,351,825 B1 | 2/2002 | Kaneda et al. |
| 6,532,548 B1 | 3/2003 | Hughes |
| 6,549,977 B1 | 4/2003 | Horst et al. |
| 6,557,123 B1 | 4/2003 | Wiencko et al. |
| 6,571,326 B2 | 5/2003 | Spiegel et al. |
| 6,581,185 B1 | 6/2003 | Hughes |
| 6,671,772 B1 | 12/2003 | Cousins |
| 6,742,137 B1 | 5/2004 | Frey, Jr. |
| 6,779,095 B2 | 8/2004 | Selkirk et al. |
| 6,836,832 B1 * | 12/2004 | Klinkner ..................... 711/170 |
| 6,993,701 B2 | 1/2006 | Corbett et al. |
| 7,073,115 B2 | 7/2006 | English et al. |
| 7,146,522 B1 * | 12/2006 | Rowe et al. ..................... 714/6 |
| 7,203,892 B2 | 4/2007 | Corbett et al. |
| 7,328,305 B2 | 2/2008 | Kleiman et al. |
| 7,409,625 B2 | 8/2008 | Corbett et al. |
| 2002/0083037 A1 | 6/2002 | Lewis et al. |
| 2002/0124137 A1 | 9/2002 | Ulrich et al. |
| 2004/0073747 A1 * | 4/2004 | Lu ............................. 711/114 |
| 2004/0260967 A1 | 12/2004 | Guha et al. |
| 2006/0075283 A1 | 4/2006 | Hartung et al. |

FOREIGN PATENT DOCUMENTS

| | | |
|---|---|---|
| WO | WO-01/13236 A1 | 2/2001 |
| WO | WO-02/29539 A2 | 4/2002 |

OTHER PUBLICATIONS

U.S. Appl. No. 10/035,607, Peter F. Corbett et al.
U.S. Appl. No. 10/394,810, Scott Schoenthal et al.
U.S. Appl. No. 10/105,872, Steven Rodrigues et al.
David Hitz et al. TR3002 File System Design for a NFS File Server Appliance published by Network Appliance, Inc.
Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.
Fielding et al. (1999) Request for Comments (RFC) 2616, HTTP/1.1.
Anvin, Peter H, "The Mathematics of RAID 6," Dec. 2004.
Auspex 4Front NS2000, System Architecture, Network-Attached Storage for a New Millennium, Auspex Engineering Technical Report 24, Jan. 1999.
Bestavros, Azer, et al., Reliability and Performance of Parallel Disks, Technical Memorandum 45312-891206-01TM, AT&T, Bell Laboratories, Department 45312, Holmdel, NJ. Dec. 1989.
Bitton, Dina, Disk Shadowing, Proceedings of the 14th VLDB Conference, LA, CA (1988).
Blaum, Mario, et al., Evenodd: An Optimal Scheme for Tolerating Double Disk Failures in RAID Architectures, Computer Architectures, News, Association for Computing Machinery, New York, US, vol. 22, No. XP000450355, Apr. 1, 1994
Blaum, Mario, et al., Evenodd: An Efficient Scheme for Tolerating Double Disk Failures in RAID Architectures, IEEE Transactions on Computers, vol. 44, No. 2, Feb. 1995, pp. 192-202.
Bultman, David L., High Performance SCSI Using Parallel Drive Technology, in Proc. Buscon Conf., pp. 40-44, Anaheim, CA, Feb. 1988.
Chen, Peter et al., Two Papers on RAIDs. Technical Report, CSD-88-479, Computer Science Division, Electricla Engineering and Computer Sciences, University of California at Berkeley (1988).
Chen, Peter M., et al., An Evaluation of Redundant Arrays of Disks Using an Amdahl 5890, Performance Evaluation, pp. 74-85, 1990.
Chen, Peter M.., et al, Maximizing Performance in a Striped Disk Array, Proc. 1990 ACM SIGARCH 17th Intern. Symp. on Comp. Arch., Seattle WA, May 1990, pp. 322-331.
Chen, Peter M., et al., RAID:High Performance, Reliable Secondary Storage, ACM Computing Surveys , 26(2):145-185, Jun. 1994.
Chervenak, Ann L., Performance Measurement of the First RAID Prototype, Technical Report UCB/CSD 90/574, Computer Science Division (EECS), University of California, Berkeley, May 1990.
Copeland, George, et al., A Comparison of High-Availability Media Recovery techniques, in Proc. ACM-SIGMOD Int. Conf. Management of Data, 1989.
Courtright II, William V., et al., RAIDframe: A Rapid Prototyping Tool for RAID Systems, Computer Science Technical Report CMU-C97-142, Carnegie Mellon University, Pittsburgh, PA 15213, Jun. 4, 1997.
Evans, "The Tip of the Iceberg:Ramac Virtual Array — Part I", Technical Support, Mar. 1997, pp. 1-4.
Gibson, Garth A., et al., Coding Techniques for Handling Failures in Large Disk Arrays, Technical Report UCB/CSD 88/477, Computer Science Division, University of California, (Jul. 1988.).
Gibson, Garth A., et al., Failure Correction Techniques for Large Disk Arrays, in Proceedings Architectural Support for Programming Languages and Operating Systems, Boston, Apr. 1989, pp. 123-132.
Gibson, Garth A., et al., Strategic Directions in Storage I/O Issues in Large-Scale Computing, ACM Computing Survey, 28(4):779-93, Dec. 1996.
Goldick, Jonathan S., et al., Multi-resident AFS: An Adventure in Mass Storage, in Proceedings of the 1995 USENIX Technical Conference, pp. 47-58, Jan. 1995.
Graham, Susan L., et al., Massive Information Storage, Management, and Use, (NSF Institutional Infrastructure Proposal), Technical Report No. UCB/CSB 89/493, Jan. 1989.

Gray, Jim et al., Parity striping of disc arrays: Low-Cost Reliable Storage with Acceptable Throughput. In Proceedings of the 16th Very Large Data Bases Conference, pp. 148--161, Brisbane, Australia, 1991.

Grimes, DW Martinez, Two Dimensional Parity Error Correction Procedure, IBM Technical Disclosure Bulletin 2686-2689, Oct. 1982.

Grimes, DW Martinez, Vertical Parity Generator for Two Dimensional Parity, IBM Technical Disclosure Bulletin 2682-2685, Oct. 1982.

Hellerstein, Lisa, et al,. Coding Techniques for Handling Failures in Large Disk Arrays. In Algorithmica vol. 2, Nr. 3, 182-208 (1994).

Hughes, James, et al., High Performance RAIT, Tenth NASA Goddard Conference on Mass Storage Systems and Technologies and Nineteenth IEEE Symposium on Mass Storage Systems, Adelphi, Maryland, USA, Apr. 2002.

Johnson, Theodore, et al, Tape Group Parity Protection, IEEE Symposium on Mass Storage, pp. 72-79, Mar. 1999.

Katz, Randy H. et al., Disk System Architectures for High Performance Computing, undated.

Kent, Jack et al., Optimizing Shadow Recovery Algorithms, IEEE Transactions on Software Engineering, 14(2):155-168, Feb. 1988.

Kim, Michelle Y., Synchronized Disk Interleaving, IEEE Transactions on Computers, C-35(11):978-988, Nov. 1986.

Kim, Michelle, et al., Asynchronous Disk Interleaving Approximating Access Delays, IEEE Transactions on Computers, vol. 40, No. 7, Jul. 1991, pp. 801-810.

Lawlor, F. D., Efficient Mass Storage Parity Recovery Mechanism, IBM Technical Disclosure Bulletin 24(2):986-987, Jul. 1981.

Lee, Edward K., et al., RAID-II: A Scalable Storage Architecture for High-Bandwidth Network File Service, Technical Report UCB/CSD 92/672, (Feb. 1992).

Lee, Edward K., et al., The Performance of Parity Placements in Disk Arrays, IEEE Transactions on Computers, vol. 42, No. 6, Jun. 1993, 14 pages.

Li, Don, Et Al., Authors' Reply, IEEE Transactions on Communications, 46:575, May 1998.

Limited Distributed DASD Checksum, A RADI Hybrid, IBW Technical Disclosure Bulletin, IBM Corp. New York, US vol. 35. No. 4A, XP000314813, Sep. 1, 1992.

Livny, Miron, et al., Multi-Disk Management Algorithms, in Proceedings of the ACM International Conference on Measurement and Modeling of Computer Systems (SIGMETRICS), pp. 69-77, Banff, Alberta, Canada, May 1987.

Meador, Wes E., Disk Array Systems, Proceedings of COMPCON, 1989, pp. 143-146.

Menon, Jai, et al., Methods for Improved Update Performance of Disk Arrays, IBM Almaden Research Center, IEEE, Jan. 1992, 10 pages.

Menon, Jai, et al., Floating Parity and Data Disk Arrays, Journal of Parallel and Distributed Computing, Boston: Academic Press, inc., vol. 17 No. 1 and 2, Jan./Feb. 1993, 13 pages.

Microsoft Computer Dictionary, 5th Edition, 2002, p. 211.

Ng, Spencer, et al., Trade-Offs Between Devices and Paths in Achieving Disk Interleaving, IEEE International Symposium on Computer Architecture, 1988, pp. 196-201.

Ng, Spencer, Some Design Issues of Disk Arrays, Proceedings of Compcon Spring '89, pp. 137-42. IEEE, 1989.

Park, Arvin, et al., Providing Fault Tolerance in Parallel Secondary Storage Systems, Technical Report CS-TR-057-86, Princeton, Nov. 1986.

Patel, Arvind M., Adaptive Cross-Parity (AXP) Code for a High-Density Magnetic Tape Subsystem, IBM Technical Disclosure Bulletin 29(6):546-562, Nov. 1985.

Patterson, D., et al., A Case for Redundant Arrays of Inexpensive Disks (RAID), Technical Report, CSD-87-391, Computer Science Division, Electrical Engineering and Computer Sciences, University of California at Berkeley (1987).

Patterson, D., et al., A Case for Redundant Arrays of Inexpensive Disks (RAID), SIGMOD International Conference on Management of Data, Chicago IL, USA, Jun. 1-3, 1988, SIGMOD RECORD (17):3109-16 (Sep. 1988).

Patterson, David A., et al., Introduction to Redundant Arrays of Inexpensive Disks (RAID). In IEEE Spring 89 COMPCON, San Francisco, IEEE Computer Society Press, Feb. 27 - Mar. 3, 1989, pp. 112-117.

Storagesuite, Performance Without Compromise: The Virtual Storage Architecture, catalogue, 1997.

Reddy, A. L. Narasimha, et al., An Evaluation of Multiple-Disk I/O Systems, IEEE Transactions on Computers, vol. 38, No. 12, Dec. 1989, pp. 1680-1690.

Scheuermann, Peter, et al., Data Partitioning and Load Balancing in Parallel Disk Systems, the VLDB Journal, vol. 7, Springer-Verlag, Copyright Feb. 1998, 19 pages.

Schulze, Martin E., Considerations in the Design of a RAID Prototype, Computer Science Division, Department of Electrical Engineering and Computer Sciences, Univ. of CA, Berkley, Aug. 25, 1988.

Schulze, Martin., et al., How Reliable is a RAID?, Proceedings of COMPCON, 1989, pp. 118-123.

Shirriff, Kenneth W., Sawmill:A Logging File System for a High-Performance RAOD Disk Array, CSD-95-862, Jan. 1995.

Stanek, William R., Microsoft Windows 2000 Server: Administering vol. Sets and RAID Arrays, 10 Jan. 2006, (http://www.microsoft.com/technet/prodtechnol/windows2000serv/maintain/operate/11w2kada,mspx), (Printed 1999).

Stodolsky, Daniel, et al., Parity Logging Overcoming the Small Write Problem in Redundant Disk Array, School of Computer Science and Department of Electrical and Computer Engineering, Carnegie Mellon University, IEEE, May 1993, 12 pages.

Stonebraker, Michael, et al., the Design of XPRS, Proceedings of the 14th VLDB Conference, LA, CA (1988).

Tanabe, Takaya, et al, Redundant Optical Storage System Using DVD-RAM Library, IEEE Symposium on Mass Storage, pp. 80-87, Mar. 1999.

Tekram — "About Raid 6".

Tweten, David, Hiding Mass Storage Under Unix: NASA's MSS-H Architecture, IEEE Symposium on Mass Storage, pp. 140-145, May 1990.

Weikum, Gerhard, et al., Dynamic File Allocation in Disk Arrays, ETH Zurich, Department of Computer Science Information Systems - Databases, ACM, SIGMOD Record, vol. 20, Issue 2, Jun. 1991, 10 pages.

Wilkes, John, et al., The HP AutoRAID hierarchical storage system, ACM Transactions on Computer Systems, Feb. 1996, vol. 14, pp. 108-136.

Schoenthal et al., "Technique for Managing Addition of Disks to a volume of a Storage System", filed as U.S. Appl. No. 12/196,847 on Aug. 22, 2008, 46 pages.

Definitions for "Checksum" and "Sector", Microsoft Computer Dictionary (fifth edition), 2002, Microsoft Press, pp. 97 and 470.

"Hard Disk", retrieved from http://www.en.wikipedia.org/wiki/hard_disk on Jan. 12, 2006, 6 pages.

* cited by examiner

QUERY-BASED SPARES MANAGEMENT TECHNIQUE

CROSS-REFERENCE TO RELATED APPLICATION

The present invention is related to the following commonly assigned U.S. patent application Ser. No. 10/394,810 titled, Technique for Managing Addition of Disks to a Volume of a Storage System, which was filed on even date herewith and is now issued as U.S. Pat. No. 7,424,637 on Sep. 9, 2008 and which application is hereby incorporated by reference as though fully set forth herein.

FIELD OF THE INVENTION

The present invention relates to storage systems and, more specifically, to a technique for managing the selection of disks for addition to a volume of a storage system.

BACKGROUND OF THE INVENTION

A storage system typically comprises one or more storage devices into which data may be entered, and from which data may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with a hard disk drive (HDD), a direct access storage device (DASD) or a logical unit number (lun) in a storage device.

Storage of information on the disk array is preferably implemented as one or more storage "volumes", defining an overall logical arrangement of disk space. The disks within a volume are typically organized as one or more groups, wherein each group is operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information with respect to the striped data. The redundant information may thereafter be retrieved to enable recovery of data lost when a storage device fails.

In the operation of a disk array, it is anticipated that a disk can fail. A goal of a high performance storage system is to make the mean time to data loss as long as possible, preferably much longer than the expected service life of the system. Data can be lost when one or more disks fail, making it impossible to recover data from the device. Typical schemes to avoid loss of data include mirroring, backup and parity protection. Mirroring stores the same data on two or more disks so that if one disk fails, the "mirror" disk(s) can be used to serve (e.g., read) data. Backup periodically copies data on one disk to another disk. Parity schemes are common because they provide a redundant encoding of the data that allows for loss of one or more disks without the loss of data, while requiring a minimal number of disk drives in the storage system.

Parity protection is often used in computer systems to protect against loss of data on a storage device, such as a disk. A parity value may be computed by summing (usually modulo 2) data of a particular word size (usually one bit) across a number of similar disks holding different data and then storing the results on the disk(s). That is, parity may be computed on 1-bit wide vectors, composed of bits in predetermined positions on each of the disks. Addition and subtraction on 1-bit vectors are an equivalent to exclusive-OR (XOR) logical operations; these addition and subtraction operations can thus be replaced by XOR operations. The data is then protected against the loss of any one of the disks, or of any portion of the data on any one of the disks. If the disk storing the parity is lost, the parity can be regenerated from the data. If one of the data disks is lost, the data can be regenerated by adding the contents of the surviving data disks together and then subtracting the result from the stored parity.

Typically, the disks are divided into parity groups, a common arrangement of which comprises one or more data disks and a parity disk. The disk space is divided into stripes, with each stripe containing one block from each disk. The blocks of a stripe are usually at equivalent locations on each disk in the parity group. Within a stripe, all but one block contain data ("data blocks") with the one block containing parity ("parity block") computed by the XOR of all the data. If the parity blocks are all stored on one disk, thereby providing a single disk that contains all (and only) parity information, a RAID-4 level implementation is provided. If the parity blocks are contained within different disks in each stripe, usually in a rotating pattern, then the implementation is RAID-5. The term "RAID" and its various implementations are well-known and disclosed in *A Case for Redundant Arrays of Inexpensive Disks* (RAID), by D. A. Patterson, G. A. Gibson and R. H. Katz, Proceedings of the International Conference on Management of Data (SIGMOD), June 1988.

Often other types of parity groupings are supported by a storage system. For example, a RAID-0 level implementation has a minimum of one data disk per parity group. However, a RAID 0 group provides no parity protection against disk failures, so loss of a single disk translates into loss of data in that group. A row-diagonal parity implementation has two parity disks per group for a minimum of three disks per group, i.e., one data and two parity disks. An example of a row-diagonal (RD) parity implementation is described in U.S. Pat. No. 6,993,701, issued on Jan. 31, 2006 titled, *Row-Diagonal Parity Technique for Enabling Efficient Recovery from Double Failures in a Storage Array* and filed Dec. 28, 2001. A RD parity group can survive the loss of up to two disks in the RAID group.

The storage operating system of the storage system typically includes a RAID subsystem that manages the storage and retrieval of information to and from the disks in accordance with input/output (I/O) operations. In addition, the storage operating system includes administrative interfaces, such as a user interface, that enable operators (system administrators) to access the system in order to implement, e.g., configuration management decisions. Configuration management in the RAID subsystem generally involves a defined set of modifications to the topology or attributes associated with a storage array, such as a disk, a RAID group, a volume or set of volumes. Examples of these modifications include, but are not limited to, disk failure handling, volume splitting, volume online/offline, changes to (default) RAID group size or checksum mechanism and disk addition.

Typically, the configuration decisions are rendered through a user interface oriented towards operators that are knowledgeable about the underlying physical aspects of the system. That is, the interface is often adapted towards physical disk structures and management that the operators may manipulate in order to present a view of the storage system on behalf of a client. For example, in the case of adding disks to a volume, an operator may be prompted to specify (i) exactly which disks are to be added to a specified volume, or (ii) a count of the number of disks to add, leaving the responsibility for selecting disks up to the storage operating system.

A prior approach to selection of disks involves interrogation of all disks coupled to the storage system using the storage operating system. Broadly stated, the operating system issues a broadcast message to which each disk responds with its name, its location and its attributes, such as the size of the disk and supported checksum style and sector size. An ordered list of disk is then created based on the sequence in which the disks respond. Disks are thereafter allocated for disk selection in the order defined by the list, e.g., from top to bottom of a disk shelf. Moreover, selection of a disk is based only on size, checksum style and format block size considerations, without regard to physical locality of the disk for, e.g., fault isolation.

However, it may be desirable for the storage operating system to factor other issues into the selection of disks, based upon the disk attributes of sector size, selected checksum algorithm and disk size. For example, a mirrored volume requires the balanced addition of disks to each of the N-plexes of the mirror. The same number of disks, with the same sector size, selected checksum algorithm and disk size, must be added to each mirror plex simultaneously.

SUMMARY OF THE INVENTION

The present invention overcomes the disadvantages of the prior art by providing a query-based spares management technique that enables a storage operating system of a storage system to select disks to be added to one or more RAID groups of a volume. The spares management technique includes a disk addition (DISKADD) selection process that is implemented by the storage operating system in response to an operator-initiated request to add disks to the volume or in response to a demand-driven request resulting from a requirement imposed by the system to add disks to the volume. The disks that are added to the RAID groups of the volume are retrieved from one or more spare pools of disks maintained by the storage system.

In the illustrative embodiment, discovery and label assimilation processes are used to place disks into the spare pools. The DISKADD selection process determines a set of disks to add to one or more RAID groups of the volume. The DISKADD selection process cooperates with a select-query-allocate (SQA) application programming interface (API) and an associated SQA manager process to determine the set of disks to allocate, as well as to optimize the order in which the disk are allocated. These processes further utilize a policy mechanism with changeable fine-grained elements of policy to provide the query-based spares management technique of the present invention.

Specifically, the SQA API enables interaction between the spare pools and a configuration tree of a RAID subsystem having a plurality of objects representing the RAID groups of the volume. The SQA API is embodied as a layer of code between one or more objects (e.g., DISKADD object) of the configuration tree and one or more objects of the spare pools. The object of the spare pool is embodied as a spare disk manager (DMGR) object that is responsible for managing the disks in each spare pool. The SQA manager is responsible, in part, for the behavior of the DMGR object.

The DISKADD selection process forms attribute-based selection query requests based upon its evaluation of the configuration tree and policy that defines the sequence and criteria for disk selection. The DISKADD selection process utilizes the SQA API to forward the requests to the SQA manager in an attempt to "narrow down" the choices of disks until it arrives at a point where it is prepared to make an allocation request. The SQA manager evaluates the attribute-based selection query requests, returns count-summary reports in response to the query requests and forwards allocation requests on behalf of the DISKDD object to the DMGR object.

According to the invention, an attribute set of the query-based spares management technique comprises a plurality of steps, each of which may have an associated element of policy. These elements of policy cooperate to produce a fine granularity of disk selection. One element of policy may be directed to priority ordering of disk attributes considered during disk selection. Another element of policy pertains to locality, wherein locality denotes electrical connectivity for purposes such as, but not limited to, fault isolation or increasing aggregate bandwidth to the volume through connections to the disks. Other elements of policy may pertain to disk selection and allocation attributes, including disk addition and disk replacement policies, each of which is associated with the volume (volume object of the configuration tree). Each volume (volume object) of the storage system may have an attribute set that is different from other volumes in the storage system.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
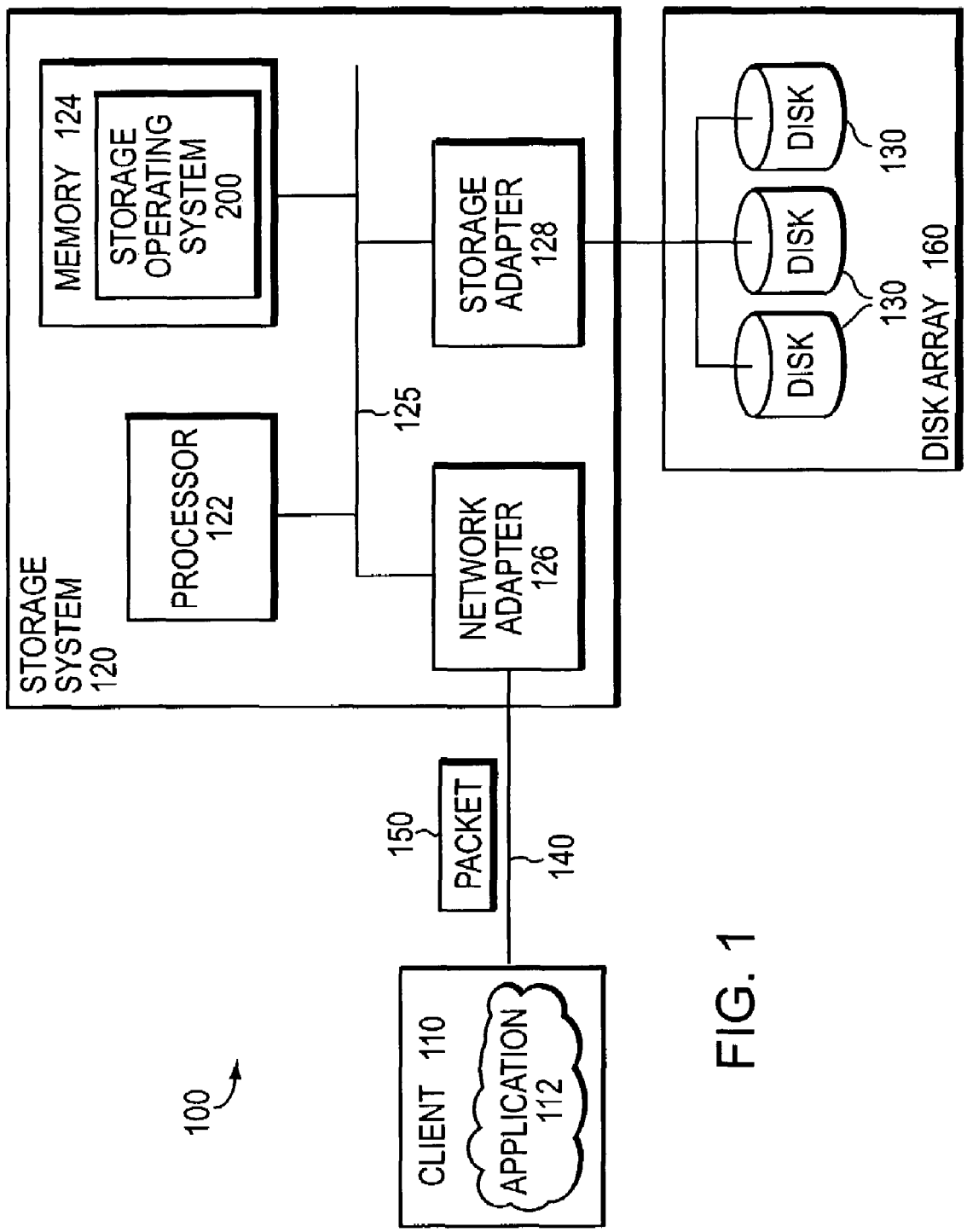
FIG. 1 is a schematic block diagram of an environment including a storage system that may be advantageously used with the present invention.

FIG. 1 is a schematic block diagram of an environment 100 including a storage system 120 that may be advantageously used with the present invention. The storage system is a computer that provides storage service relating to the organization of information on storage devices, such as disks 130 of a disk array 160. The storage system 120 comprises a processor 122, a memory 124, a network adapter 126 and a storage adapter 128 interconnected by a system bus 125. The storage system 120 also includes a storage operating system 200 that preferably implements a file system to logically organize the information as a hierarchical structure of directories, files and virtual disks (hereinafter "blocks") on the disks.

In the illustrative embodiment, the memory 124 comprises storage locations that are addressable by the processor and adapters for storing software program code and data structures associated with the present invention. The processor and adapters may, in turn, comprise processing elements and/or logic circuitry configured to execute the software code and manipulate the data structures. Storage operating system 200, portions of which are typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the storage system 120 to a client 110 over a computer network 140, which may comprise a point-to-point connection or a shared medium, such as a local area network. Illustratively, the computer network 140 may be embodied as an Ethernet network or a Fibre Channel (FC) network. The client 110 may communicate with the storage system over network 140 by exchanging discrete frames or packets of data according to pre-defined protocols, such as the Transmission Control Protocol/Internet Protocol (TCP/IP).

The client 110 may be a general-purpose computer configured to execute applications 112. Moreover, the client 110 may interact with the storage system 120 in accordance with a client/server model of information delivery. That is, the client may request the services of the storage system, and the system may return the results of the services requested by the client, by exchanging packets 150 over the network 140. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the storage operating system 200 executing on the system 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130, such as HDD and/or DASD, of array 160. The storage adapter includes input/output (I/O) interface circuitry that couples to the disks over an I/O interconnect arrangement, such as a conventional high-performance, FC serial link topology.

Storage of information on array 160 is preferably implemented as one or more storage "volumes" that comprise a collection of physical storage disks 130 cooperating to define an overall logical arrangement of disk space on the volume(s). Each volume is generally, although not necessarily, associated with its own file system. The disks within a volume/file system are typically organized as one or more groups, wherein each group is operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. Although a RAID-4 level implementation is illustratively described herein, it should be understood that other types and levels of RAID implementations may be used in accordance with the inventive principles described herein.

To facilitate access to the disks 130, the storage operating system 200 implements a write-anywhere file system that cooperates with virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system including, for example, a write in-place file system, may be enhanced for use in accordance with the inventive principles described herein. As such, where the term "WAFL" is employed, it should be taken broadly to refer to any storage operating system that is otherwise adaptable to the teachings of this invention.

Figure 2:
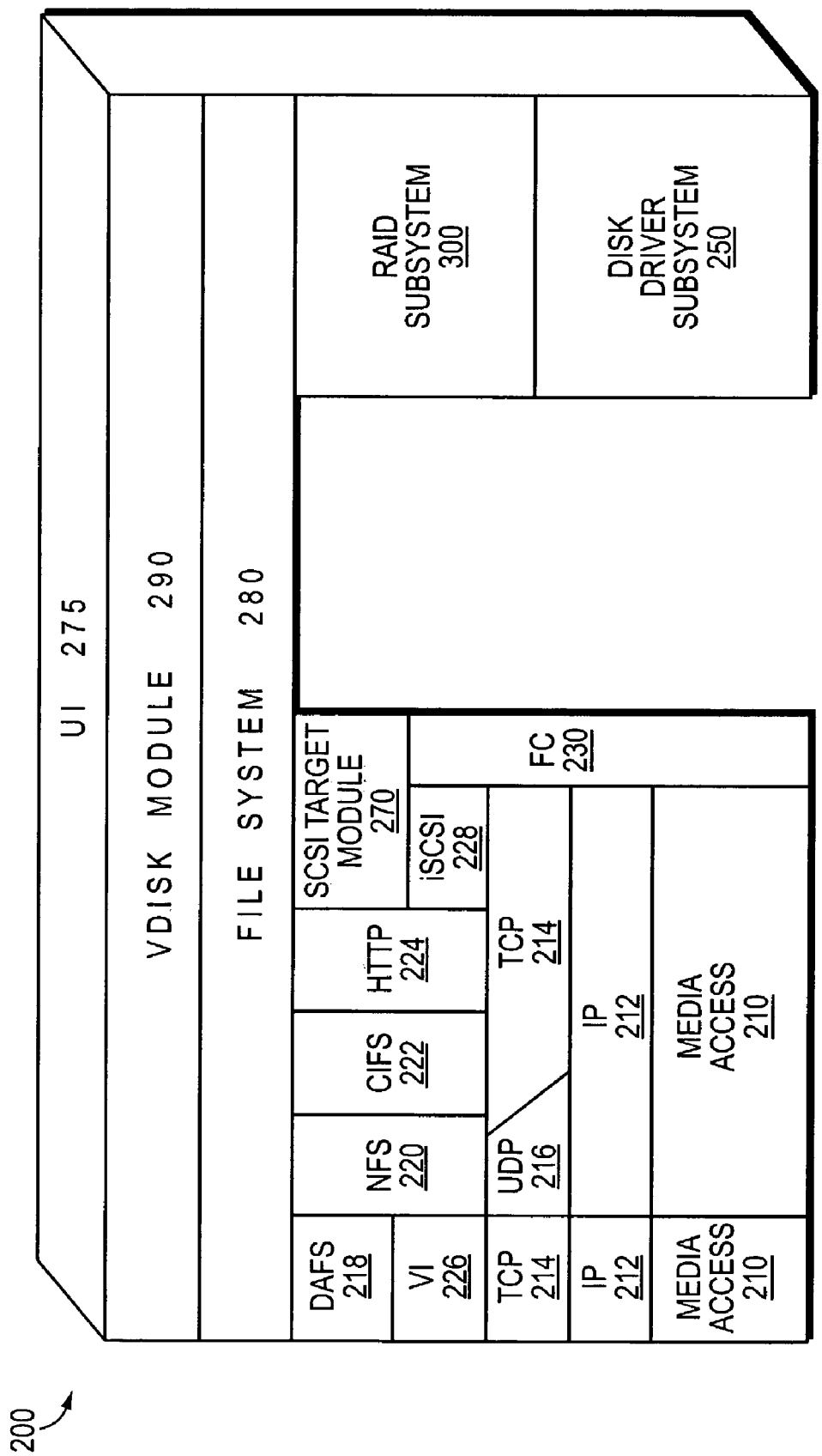
FIG. 2 is a schematic block diagram of a storage operating system that may be advantageously used in the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the Direct Access File System (DAFS) protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a storage device manager embodied as a RAID subsystem 300 that manages the storage and retrieval of information to and from the volumes/disks in accordance with I/O operations, and a disk driver subsystem 250 that implements a disk access protocol such as, e.g., the SCSI protocol.

Bridging the disk software layers with the integrated network protocol stack layers is a virtualization system that is implemented by a file system 280 interacting with virtualization modules illustratively embodied as, e.g., vdisk module 290 and SCSI target module 270. The vdisk module 290 is layered on the file system 280 to enable access by administrative interfaces, such as a user interface (UI) 275, in response to a user (system administrator) issuing commands to the storage system. The SCSI target module 270 is disposed between the FC and iSCSI drivers 228, 230 and the file system 280 to provide a translation layer of the virtualization system between the block (lun) space and the file system space, where luns are represented as blocks. The UI 275 is disposed over the storage operating system in a manner that enables administrative or user access to various layers and subsystems, such as the RAID subsystem 300.

The file system is illustratively a message-based system that provides volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements the WAFL file system having an on-disk format representation that is block-based using, e.g., 4 kilobyte (kB) blocks and using index nodes ("inodes") to identify files and file attributes (such as creation time, access permissions, size, and block location). The file system uses files to store metadata describing the layout of its file system; these metadata files include, among others, an inode file. A file handle, i.e., an identifier that includes an inode number, is used to retrieve an inode from disk.

Operationally, a request from the client 110 is forwarded as a packet 150 over the computer network 140 and onto the storage system 120 where it is received at the network adapter 126. A network driver (of layer 210 or layer 230) processes the packet and, if appropriate, passes it onto a network protocol and file access layer for additional processing prior to forwarding to the file system layer 280. Here, the file system generates operations to load (retrieve) the requested data from disk 130 if it is not resident "incore", i.e., in the memory 124. If the information is not in memory, the file system 280 indexes into the inode file using the inode number to access an appropriate entry and retrieve a logical volume block number (VBN). The file system then passes a message structure including the logical VBN to the RAID subsystem 300, which maps that logical number to a disk block number (DBN) and sends the latter to an appropriate driver (e.g., SCSI) of the disk driver subsystem 250. The disk driver accesses the DBN from disk 130 and loads the requested data block(s) in memory 124 for processing by the storage system. Upon completion of the request, the storage system (and operating system) returns a reply to the client 110 over the network 140.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120 in response to a request issued by client 110. Moreover, in another alternate embodiment of the invention, the processing elements of adapters 126, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may, in the case of a file server, implement file system semantics. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., file server or filer) or general-purpose computer, including a standalone computer or portion thereof, embodied as or including a storage system 120. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 3:
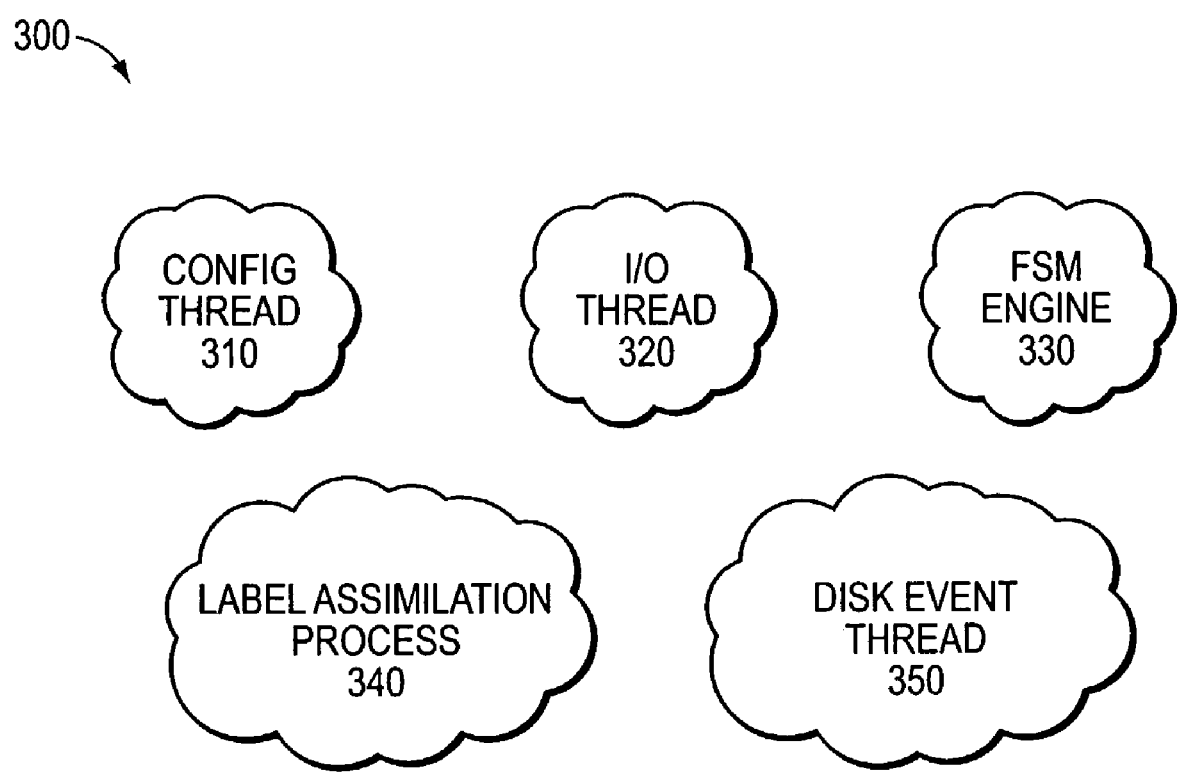
FIG. 3 is a schematic block diagram illustrating processes and threads of a RAID subsystem of the storage operating system of FIG. 2.

The present invention is implemented in the context of a configuration management framework used to implement the RAID subsystem 300 in the storage operating system 200. In a preferred embodiment, the configuration management framework provides an object-oriented approach to RAID configuration management, as described herein with respect to an implementation of the RAID subsystem. FIG. 3 is a schematic block diagram illustrating one or more modules or processes and threads of the RAID subsystem 300, wherein each process has, among other things, a (virtual) memory address space, executable code and data. A process is started with a single thread, but can create additional threads from any of its threads. The threads execute in the same memory address space and can therefore work concurrently on shared data. For example, an instantiator module implements a configuration (config) thread 310 adapted to maintain relationships among and invoke behaviors of decomposed software components ("RAID objects") that collectively form the behaviors associated with a collection of (RAID) volumes on the storage system. In addition, an I/O manager module implements an I/O thread 320 configured to issue I/O transaction requests from the RAID subsystem to the disk driver subsystem and, upon completion, process the results.

A finite state machine (FSM) module or engine 330 is used to arbitrate a set of events and states that a process or thread of the RAID subsystem may encounter. Transactional semantics isolate the behavior of state changes in the RAID subsystem from concurrent I/O operations. The framework provides a two-phase commit procedure, coordinated with updates to on-disk configuration data ("labels"). Errors during disk label updates are handled by aborting the transaction, releasing partially committed data and unwinding any pending state transitions. A state notification mechanism integrated with the FSM engine 330 propagates state changes through the threads in order to provide a coordinated behavior.

According to the configuration management framework, a volume comprises the aggregate behavior of a number of RAID objects. Each RAID object ("object") comprises operational code and static state, such as configuration information, relating to the topology of the underlying physical storage devices, e.g., disks 130, contained in disk array 160. The objects are organized into a configuration tree with configuration interfaces defining a set of services provided by one or more processes of the RAID subsystem. Although the objects may be implemented in accordance with an object-oriented programming paradigm, the present invention is not limited to such an implementation. More broadly, the objects of the configuration tree refer to abstract entities representing a logical combination/configuration of the disks. That is, the objects are used to present a view of the underlying topology of the storage array managed by the RAID subsystem.

Figure 4:
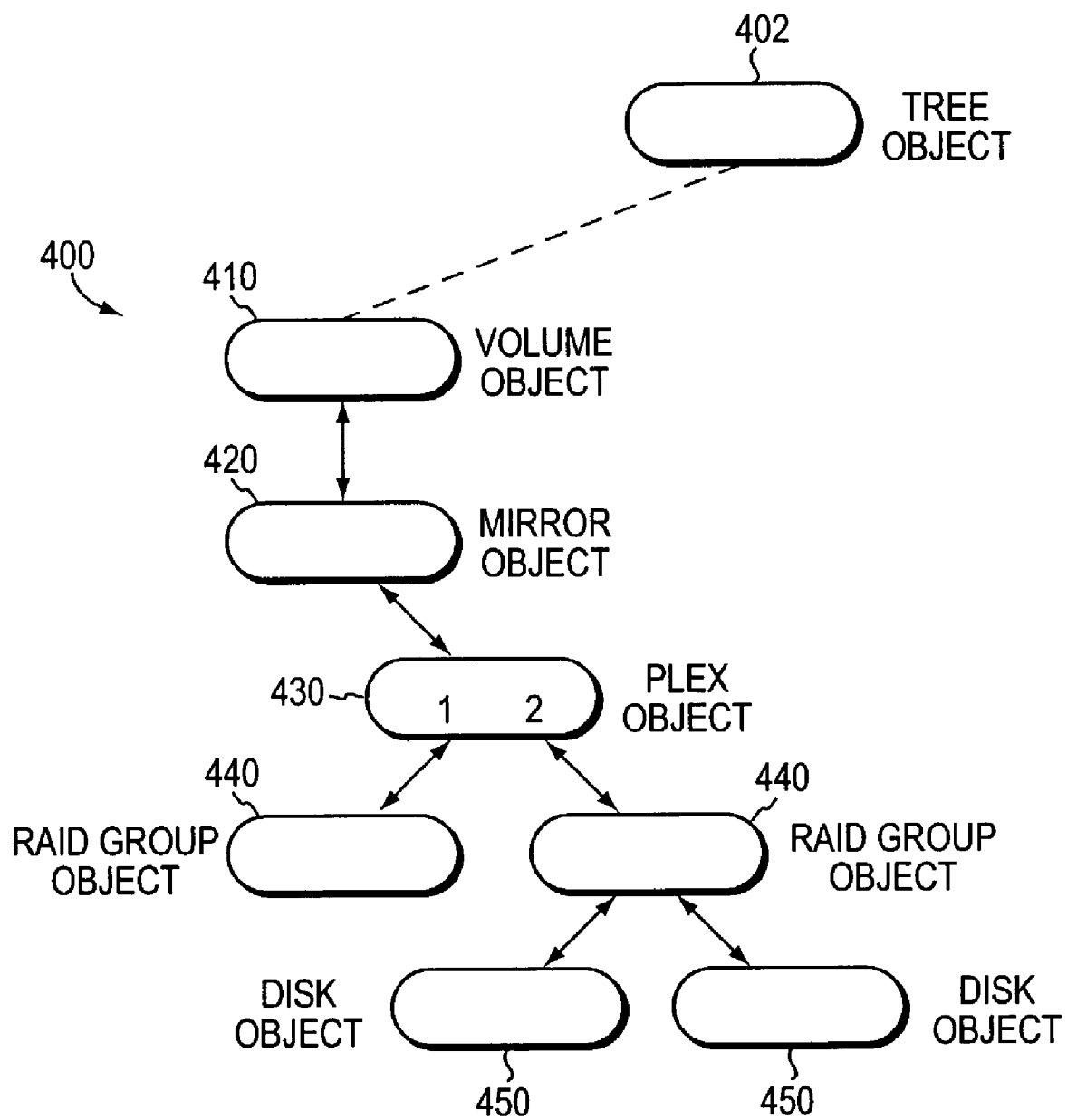
FIG. 4 is a schematic block diagram of an in-core representation of an embodiment of a RAID configuration tree structure in accordance with a configuration management framework that may be advantageously used in the present invention.

FIG. 4 is a schematic block diagram of an in core representation of an embodiment of a RAID configuration tree structure 400 in accordance with the configuration management framework. The configuration tree 400 comprises a plurality of objects arranged by the RAID subsystem into levels that cooperate to organize one or more physical disks into a single logical volume. References between objects (e.g., between a superior "parent" object and each of its subordinate "children" objects) are bi-directional memory address pointers that enable each child to reference its parent (and vice versa). These pointers are part of the metadata stored within each of the objects.

Objects have an associated type, with each object type providing its own implementation of the configuration interfaces. A volume is organized into a hierarchical configuration tree of objects that includes a tree object 402 responsible for coordinated behavior with the file system and a volume object 410 responsible for managing the RAID aspects of volume management. Specifically, the volume object 410 represents the (WAFL) file system at the highest level (i.e., root node) of the configuration tree 400. To that end, the volume object 410 stores metadata that describes a volume/file system, wherein the metadata includes information such as the name of the volume and address range (in physical blocks) of the volume. The name of the volume resides in a volume namespace that is exported by the UI 275 of the storage operating system 200. The logical address space of the file system is mapped to the physical (block) address space in the RAID subsystem 300.

The configuration tree 400 and, in particular, the volume object 410 represent a logical disk that is presented to the file system by the RAID subsystem as a "container" for the file system to store its data. That is, the objects of the configuration tree are organized to create an address space that resembles a single logical disk but, in reality, comprises a plurality of physical disks. In this context, the volume object 410 is equivalent to the tree object 402, wherein the tree object stores additional metadata about the logical volume that is presented to the file system. This additional metadata includes the type (level) of parity implementation configured for the particular volume (e.g., RAID-4, RAID-0, mirror_RAID-4, mirror_RAID-0, RD parity). Since the tree object is a one-to-one representation of the volume, the additional metadata stored in the tree object includes redundant information about the volume, such as its name and physical address/block range.

A next object level comprises a mirror object 420 that is responsible for coordinating one or more copies of the volume (termed "plexes") in support of data mirroring. In synchronous data mirroring, two "mirror" copies are provided that are at all times synchronized. That is, changes to the data in one mirrored copy are immediately reflected in the other mirrored copy. The two identical mirrored copies have matching address spaces that are within the volume address space and that provide identical synchronized full copies of the data in the volume.

A plex object 430 is responsible for managing an instance of a copy of volume data and thus represents each mirrored copy within another object level of the configuration tree. Whereas the mirror object 420 stores metadata that is used to coordinate one or more copies (or plexes) of the volume in support of data mirroring, each plex object 430 stores metadata that is used to manage an instance of a copy of volume data. The plex object may include an ordinal placement (e.g., 1, 2) indicating that, for example, a first part (1) of the address space is associated with a particular RAID group and that a second part (2) of the address space is associated with another RAID group. A next object level comprises one or more RAID group objects 440 per plex object. Each RAID group object 440 contains metadata that provides data protection and I/O coordination over a set of disks. The metadata of the RAID group object includes information such as the number of disks within the RAID group and the address (block) range of each disk within the RAID group. In this context, a RAID group is defined as a number of disks and the address/block space associated with those disks. Finally, there is another object level comprising one or more disk objects 450 per RAID group object, wherein each disk object 450 contains metadata that provides data access to the physical disks 130.

The configuration tree 400 is constructed in the memory 124 of the storage system 120 by a label assimilation process 340 of the RAID subsystem 300. According to the assimilation process, each disk associated with a volume includes a label that describes its placement and association with that volume. The on-disk label is, in essence, self-describing information for each disk that is actively attached to the storage system 120. The labels are used to dynamically assemble the disks into a volume and to construct an in core configuration tree 400 for that volume, starting from the disk object level up to the volume object level. Therefore, a label on a disk identifies that disk's participation in a RAID group and, furthermore, that group's association with plex, mirror and, ultimately, volume objects in the configuration tree. The label is located in a well-known location of the disk so that it can be queried by the RAID subsystem in accordance with, e.g., a discovery process during a boot operation. The discovery process illustratively implements a disk event thread 350 described herein.

Each object type instance of the configuration tree 400 comprises the following components: service interfaces, committed transactional state, pre-committed transactional state and non-transactional state. The service interfaces comprise an application programming interface (API) that the object exports to other software components. In the illustrative embodiment, the service interfaces include initialization and destruction, child object management (add, replace), online/offline, transaction management (join, commit, abort, label I/O, state change notify), virtual block management, and I/O handling (context creation/deletion, resource management, I/O throttling). Each object type defines the commit, pre-committed, and non-transactional state that it holds. The transaction management interfaces are provided as a mechanism to create and modify transactional state in a manner that is coordinated across all objects in a volume.

The basic flow of control starts with a configuration management operation issued by, e.g., the file system 280 and received by the RAID subsystem 300. The file system passes the configuration management operation in the form of a message request that specifies a target volume- and defines a named operation with specific parameters. The configuration thread 310 of the RAID subsystem receives the request and determines the object (e.g., volume, RAID group) of the configuration tree 400 for the volume to which the request is directed. The configuration thread then locates the tree object 402 for the volume and invokes relevant configuration operations using service interfaces of the appropriate object. When a service interface is invoked, the object is transparently "joined" to the request prior to activation of the interface. Joining of an object to a request results in copying of the currently committed state into a pre-committed state area (called the "trans" area of the object). The trans area is a portion of memory that records changes to the object that are pending commitment. The service interface makes its changes to the trans area. If the changes to the object result in a change of the state of the object, the FSM engine 330 is invoked.

The FSM engine 330 provides a critical component in managing the interrelationship between objects in a RAID volume. Specifically, the FSM engine defines the state/event pairs that are "legal" and, for each state/event, provides a mechanism to implement the invocation and determine any subsequent state transitions. In addition, the FSM engine provides tracing mechanisms to track the set of transitions that have occurred and provides object notification for pre-committed and committed state transitions. More specifically, the FSM engine 330 is responsible for determining the new state of the object (based upon a per object type state/event table) and invoking the state notification interface of its "superior" object in the volume hierarchy. The FSM engine includes an upward notification mechanism (e.g., from child to parent object) to notify the parent object about a state change in the child object.

When the configuration request completes all service interface invocations, it requests a label commit operation to persistently store the modified state. The label commit "pulls" data from the trans area in order to construct its new version of the label data. Label commit is deemed to be successful only if all labels in a plex can be successfully written. Once all labels have been successfully written, each object that has been joined to the request is responsible for copying its trans area data back to the committed state portion of the object. If labels are not successfully written, the trans area is discarded, any disk failures are identified and resulting configuration changes are initiated, the successfully written labels are re-written with the previous state, and the original configuration request is retried.

The present invention relates to a query-based spares management technique that enables a storage operating system of a storage system to select disks to be added to one or more RAID groups of a volume. The spares management technique includes a disk addition (DISKADD) selection process that is implemented by the storage operating system in response to an operator-initiated request to add disks to the volume or in response to a demand-driven request resulting from a requirement imposed by the system to add disks to the volume. The disks that are added to the RAID groups of the volume are retrieved from one or more spare pools of disks maintained by the storage system.

Figure 5:
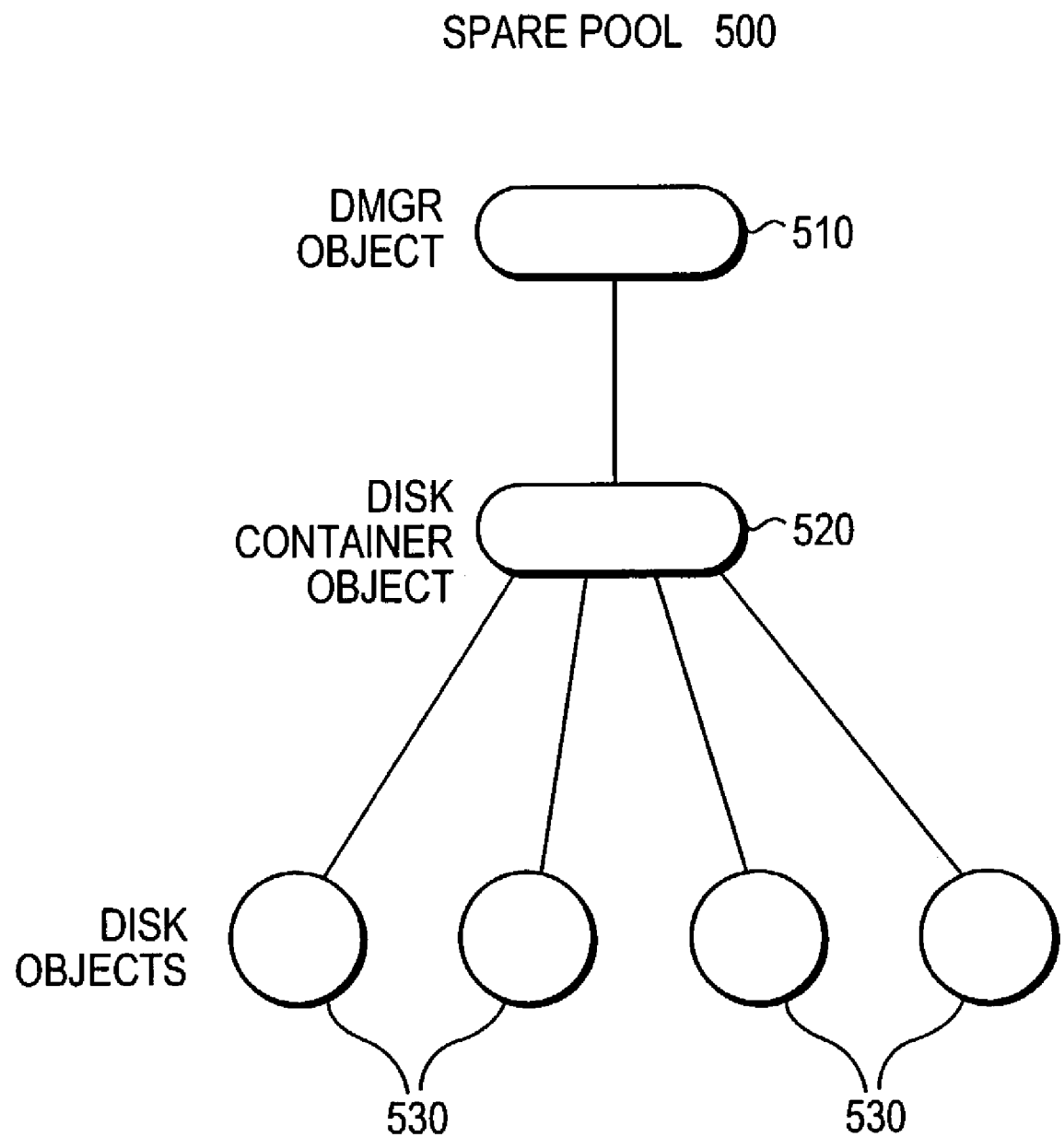
FIG. 5 is a schematic block diagram of a spare pool of the storage system that may be advantageously used with the present invention.

In the illustrative embodiment, the storage system has one or more "global" spare pools that may be situated in various geographical locations. FIG. 5 is a schematic block diagram of a spare pool 500 as represented in the RAID subsystem by a spare disk manager (DMGR) object 510 having an associated disk container (child) object 520 that maintains various disk objects 530 contained in the spare pool. The DMGR object is a higher-level abstraction than that of the disk container object and is responsible for managing the disks in each spare pool. Each DMGR object 510 has a type, such as spare (denoting a pool of functioning spare disks), broken (denoting a pool of failed disks) and owner (denoting a pool of spare disks for exclusive write access). As a result, the DMGR object is further responsible for managing disks in a broken pool and in a list of orphan disks. An orphan disk is a disk that, according to its on-disk label, is associated with a configuration tree, but which currently does not participate in a consistency label set (CLS) algorithm for that tree.

The disk container object 520 provides a convenient way of grouping individual disks within a parent object, such as a DMGR object 510 or a DISKADD object. The DISKADD object is described in U.S. Pat. No. 7,424,637 titled, *Technique for Managing Addition of Disks to a Volume of a Storage System*. Each disk container object 20 includes information such as the number of member disk objects 530 within the spare pool, along with a count of the number of those disks that have been prepared for volume addition. In a preferred embodiment, preparation includes a complete zeroing of the disk blocks used for RAID parity calculations.

The disk objects 530 contained in a disk container object are similar to the disk objects 450 in the configuration tree 400. These disk objects contain information such as the name of the disk, the size of the disk, the selected checksum algorithm and the sector size. The information contained in the disk objects is provided to the disk event thread 350 of the RAID subsystem by the disk driver subsystem 250. The label information associated with the CLS algorithm of the label assimilation process 340 determines whether a disk object is placed within the configuration tree 400 of a volume or in a spare pool 500. The CLS algorithm is described in U.S. Pat. No. 7,133,964, issued on Nov. 7, 2006 and titled *RAID Assimilation Method and Apparatus*, which patent application is hereby incorporated by reference as though fully set forth herein.

Figure 6:
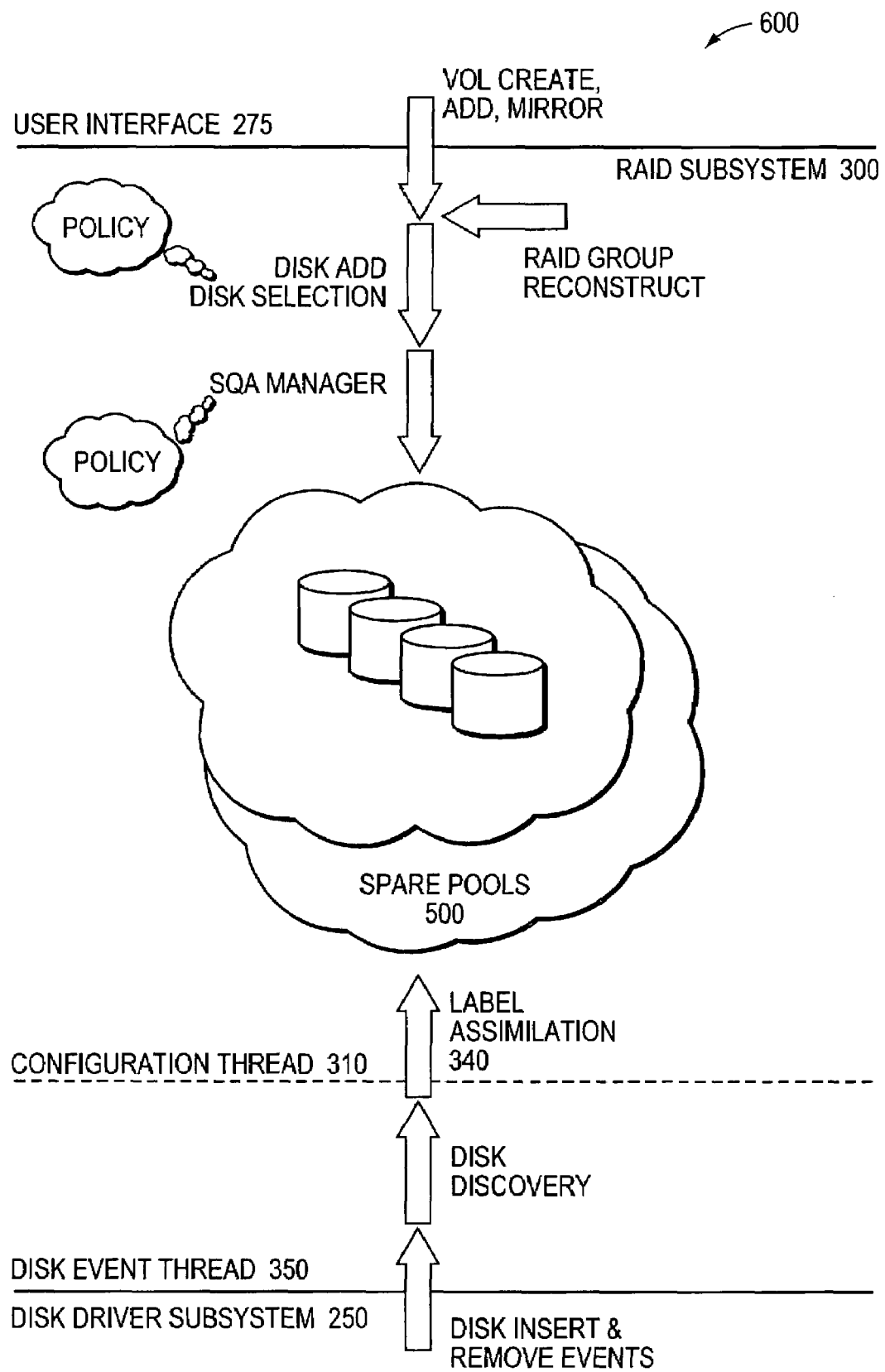
FIG. 6 is a schematic block diagram showing the interaction between a user interface, a disk driver subsystem and the RAID subsystem of the storage operating system when creating the spare pool of FIG. 5.

FIG. 6 is a schematic block diagram showing the interaction 600 between the UI 275, the disk driver subsystem 250 and the RAID subsystem 300, e.g., the disk event thread 350 and the label assimilation process 340, when creating spare pools of disks. The disk event thread and label assimilation process are used to place disks into the spare pools. Specifically, disks are placed into a spare pool as a result of the disk driver subsystem 250 notifying the disk event thread 350 about the existence of the disks, prompting the thread 350 to query the disk driver subsystem 250 for details about the disks (e.g., their names, connectivity, blocks per sector and capacity). The disk event thread 350 also derives disk hardware-based ownership and spare pool membership, based upon information it obtains from the disk driver subsystem and rules for determining ownership and spare pool membership.

In addition, the disk event thread 350 creates a RAID object representing the attributes and behaviors of the disk. The thread 350 then calls the label assimilation process 340 to initialize attributes associated with the RAID object. The label assimilation process reads the on-disk labels from the disks that are owned by the storage system. The label assimilation process 340 places disks that it determines to be spares (based upon those disk labels) into a spare pool 500 determined by the disk event thread 350. In a preferred embodiment, the disks in a spare pool do not share any single point of failure (with respect to connectivity) with the spare disks of another spare pool.

A plurality of methods is available for selecting disks, two of which are operator initiated. One example of such a method allows the operator to initiate selection of a specific disk for addition to a specific volume based upon, e.g., a name of the disk, wherein the name is based on a physical location of the disk in the system. The name of a disk may, for instance, be derived from an adapter number, a disk shelf identifier and a slot identifier within the disk shelf. Alternatively, the operator may merely request that one or more disks be added to a particular volume, without indicating the particular disks. An example of an operator-initiated request for selection of disks is described in co-pending U.S. Pat. No. 6,836,832, issued on Dec. 28, 2004 and titled *System And Method For Pre-selecting Candidate Disks Based On Validity For Volume*, filed on Dec. 21, 2001, which application is hereby incorporated by reference as though fully set forth herein.

A third method for selecting a disk to add to a volume is a "demand-driven" request that results from the imposed system requirement to add a disk to a RAID group. This method is generally similar to the alternative operator-initiated method in that no specific disk is identified for addition to the RAID group. As such, the selection is made by the storage operating system as opposed to the operator. An example of a demand-driven request is a request for a replacement disk during a reconstruction operation that occurs as a result of a RAID group transitioning into a degraded mode.

The present invention is directed to the alternative operator-initiated and demand-driven requests to add a disk to a volume, wherein the DISKADD selection process determines which disk "best suits" the request based on a current configuration of the volume and RAID group and the current configuration of the spare pools, as well as elements of policy. That is, as opposed to object-based disk addition directed to integration/placement of disks into RAID groups once the disks have been selected, the present invention is related to a technique for actually selecting and allocating spare disks for placement into RAID groups of the volume.

Spare disk selection and allocation may be performed in response to a user entering a CLI command at the UI 275, wherein the CLI command may comprise a vol add, vol create or vol mirror command, or if a disk fails and needs replacement. As described herein, the DISKADD selection process has a policy set associated therewith that defines the sequence and criteria surrounding disk selection and allocation. The policy set is illustratively implemented in a "backend" (e.g., RAID subsystem) of the storage operating system executing on the storage system. However, it should be understood that the policy set may alternatively be implemented in a "front end" (e.g., the user interface) of storage operating system.

Figure 7:
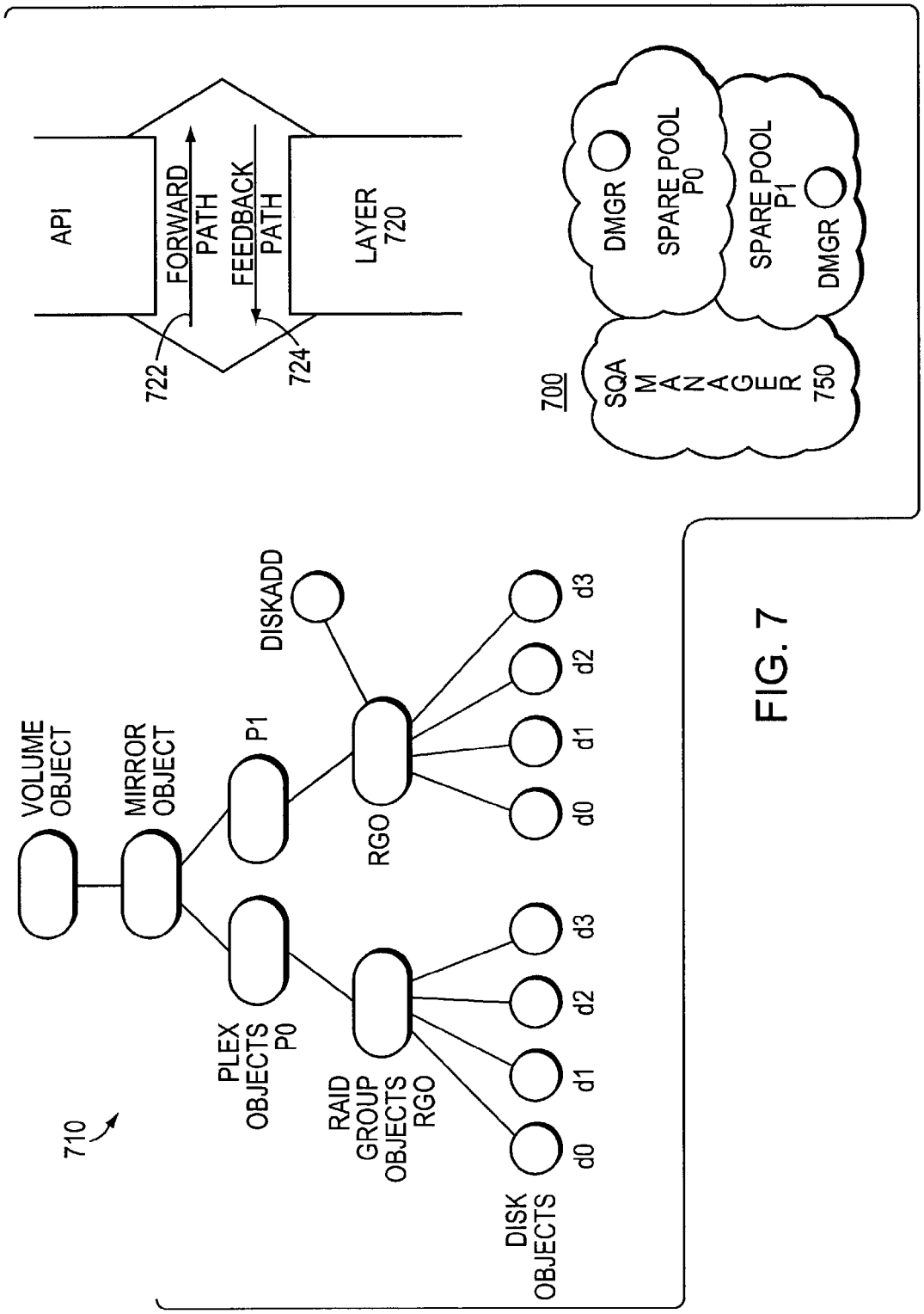
FIG. 7 is a schematic diagram illustrating the interaction between one or more spare pools of the storage system and a configuration tree in accordance with the invention.

FIG. 7 is a schematic diagram illustrating the interaction 700 between one or more spare pools P0, P1 of the storage system and an embodiment of a configuration tree 710 in the RAID subsystem. The configuration tree 710 represents a 2-way mirrored volume having "balanced" plexes (an equal count and sizes of contained disks), wherein each plex includes a single RAID group having three disks. Disks may be added to the mirrored volume via the vol add command that performs a pair-wise addition of disks to each RAID group of each plex. For example, in response to a vol add 4 CLI command, the RAID subsystem adds two spare disks (disk objects) to each plex (plex objects p0, p1) of the mirrored volume. Furthermore, the spare disk objects added to plex object p0 originate from spare pool P0 and the spare disk objects added to plex object p1 originate from spare pool P1. This represents a fault isolation feature of the present invention.

In the illustrative embodiment, the DISKADD selection process is embodied as a layer of the DISKADD object that determines a set of disks to add to one or more RAID groups of the volume. The DISKADD selection process cooperates with a select-query-allocate (SQA) application programming interface (API) and associated SQA manager process 750 to determine the set of disks to allocate, as well as to optimize the order in which the disk are allocated. These processes further utilize a policy mechanism with changeable fine-grained elements of policy to provide the query-based spares management technique of the present invention.

Specifically, a set of SQA APIs enables interaction between the spare pools and a configuration tree of a RAID subsystem having a plurality of objects representing the RAID groups of the volume. The SQA API is embodied as a layer of code between one or more objects (e.g., the DISKADD object) of the configuration tree and one or more objects (e.g., the DMGR objects) of the spare pools. The SQA manager 750 is illustratively disposed adjacent to the spare pools and is responsible, in part, for behaviors of the spare pool type of DMGR objects.

The DISKADD selection process forms attribute-based selection query requests based upon its evaluation of the configuration tree and policy that defines the sequence and criteria for disk selection. The DISKADD selection process utilizes the SQA API to forward the requests to the SQA manager in an attempt to "narrow down" the choices of disks until it arrives at a point where it is prepared to make an allocation request. The SQA manager 750 evaluates the attribute-based selection query requests, returns count-summary reports in response to the query requests and forwards allocation requests on behalf of the DISKDD object to the DMGR object.

In the illustrative embodiment, one tuple of the selection query request expresses select-query attributes on which to search. Each select tuple includes an attribute type and value (e.g., disk size, 32 GB) and a binary operand (e.g., less-than, greater-than, equal-to, not-equal-to). A report format tuple expresses each attribute type to include in a count summary of disks with the particular attribute value that matched the select tuple. If no particular attribute is specified, then the default is to provide a total count of disks matching the specified select-query attributes tuple. An argument is provided to specify a sort order for the summary report, e.g., ascending or descending order.

Assume a data disk (d3) of RAID group (rg0) of plex (p1) fails, representing a degraded RAID group situation, and a demand-driven request arises for disk selection. A notification is sent from disk object d3 to the RAID group object rg0 of plex p1, notifying the RAID group object of the failure. As a result, the FSM engine 330 forces RAID group object rg0 into a degraded state. Upon entering the degraded state, the RAID group object attempts to reconstruct the failed disk by requesting a replacement disk from the DISKADD object.

The DISKADD object forms a query request based on the configuration of the degraded RAID group and the appropriate policy. The query request contains attributes such as the minimum size of the disk that is required, the selected checksum algorithm, spare pool information and, perhaps, locality information as described further herein. The request is then sent to the SQA manager 750 via a select-query function call over a "forward path" 722 of the API layer 720 to select one or more disks from a spare pool.

Specifically, selection of a spare disk from a spare pool depends upon the SQA API, which enables interactions between the spare pool and the DISKADD object. The DISKADD object illustratively determines a spare pool from which to allocate disks. For example in the case of a mirrored volume, the DISKADD object determines the spare pool to target, based upon the plex to which the disks are added. Once the spare pool has been determined, the initial set of candidate disks for disk allocation includes all disks in the pool. The DISKADD selection process then forms a series of database style query requests that is sent to the SQA manager 750 through the select-query API in order to "narrow down" the set of possible candidate spare disks until a set of candidates that meet the allocation request is determined.

More specifically, the DISKADD object evaluates the configuration tree 710 (or an object within the tree) for the volume and forms query requests with desired attributes for use by the SQA manager. That is, although the context for the evaluation is "broadly" directed to the configuration tree, that context may be further directed to a RAID object (e.g., the RAID group object) within the configuration tree. In addition, for a mirror volume configuration, the context may be expanded to include fault isolation characteristics as well as pair-wise matching of disk characteristics, such as size and checksum algorithm. This, in turn, may require coordination between multiple spare pools to ensure that the response to the disk selection request satisfies pair-wise constraints associated with the mirror configuration.

According to an aspect of the invention, the SQA manager 750 utilizes the attributes in the query requests to select disks from the spare pools and returns, via select-query API function calls over a "feedback path" 724 of the API layer 720, the count-summary reports to satisfy the series of database style query requests. If the manager 750 cannot satisfy a request, it returns an error and any available information. In response, the DISKADD object may form another query request. As a result, an iterative process is established wherein the DISKADD object queries the SQA manager with desired attributes of available spare disks and the manager 750 uses those attributes to select the best available disks per set policy.

In summary, the DISKADD object examines the configuration of the degraded RAID group to form the attributes-based query requests to select the best replacement disk. The SQA manager makes the selection as to which spare disk best satisfies the replacement request based on the attributes using the spares management technique described herein. For example, if examination of the RAID group configuration indicates that fault tolerant characteristics are important, then the technique strives for selection of a disk that can be co-located within a disk shelf containing other disks of the RAID group. If the selection cannot identify disks co-located with other disks in the RAID group, preference may be given to disks sharing loop and shelf attachments. Yet, if the configuration indicates that I/O bandwidth/throughput is important, then the technique attempts disk selection in a manner that "spreads" (balances) the disks (load) of the RAID group across many "channels" (e.g., adapters) and disk shelves of the storage system.

In the case of load balancing as a determining criterion for disk replacement, assume that the storage system includes four (4) storage adapters 128, wherein each adapter is coupled to a disk shelf of disks. If each of the disks in the RAID group is coupled to a different adapter (adapters 1-4) and the failed disk d3 is coupled to, e.g., adapter 4, then the spares management technique strives to select a replacement disk that is connected to adapter 4 so as to maintain the load balancing arrangement of that RAID group. Here, the physical locality of a disk shelf is not as important as maintaining the previous adapter connection. Note that load balancing is particularly important with respect to parity disks used in multiple RAID groups. That is, it is desirable to have the parity disk of each RAID group coupled to a different storage adapter 128 of the storage system 120 in an alternating arrangement to avoid a "hot spot" of I/O activity on one adapter.

Once the DISKADD object arrives at its final set of candidate disks, based upon responses from the SQA API, it makes a spares allocation request through the spares query/allocation API layer 720. In response, the SQA manager 750 optimizes the order of the candidates to match the allocation request and returns (to the DISKADD object) the optimized order of candidate disks selected to replace the failed disk. The FSM engine 330 then transitions the RAID group into a reconstruct state. In this state, the RAID group object reconstructs the data on the failed disk using its constituent data/parity disks of the RAID group. After the data is reconstructed, the FSM engine 330 transitions the RAID object to a normal state.

Figure 8:
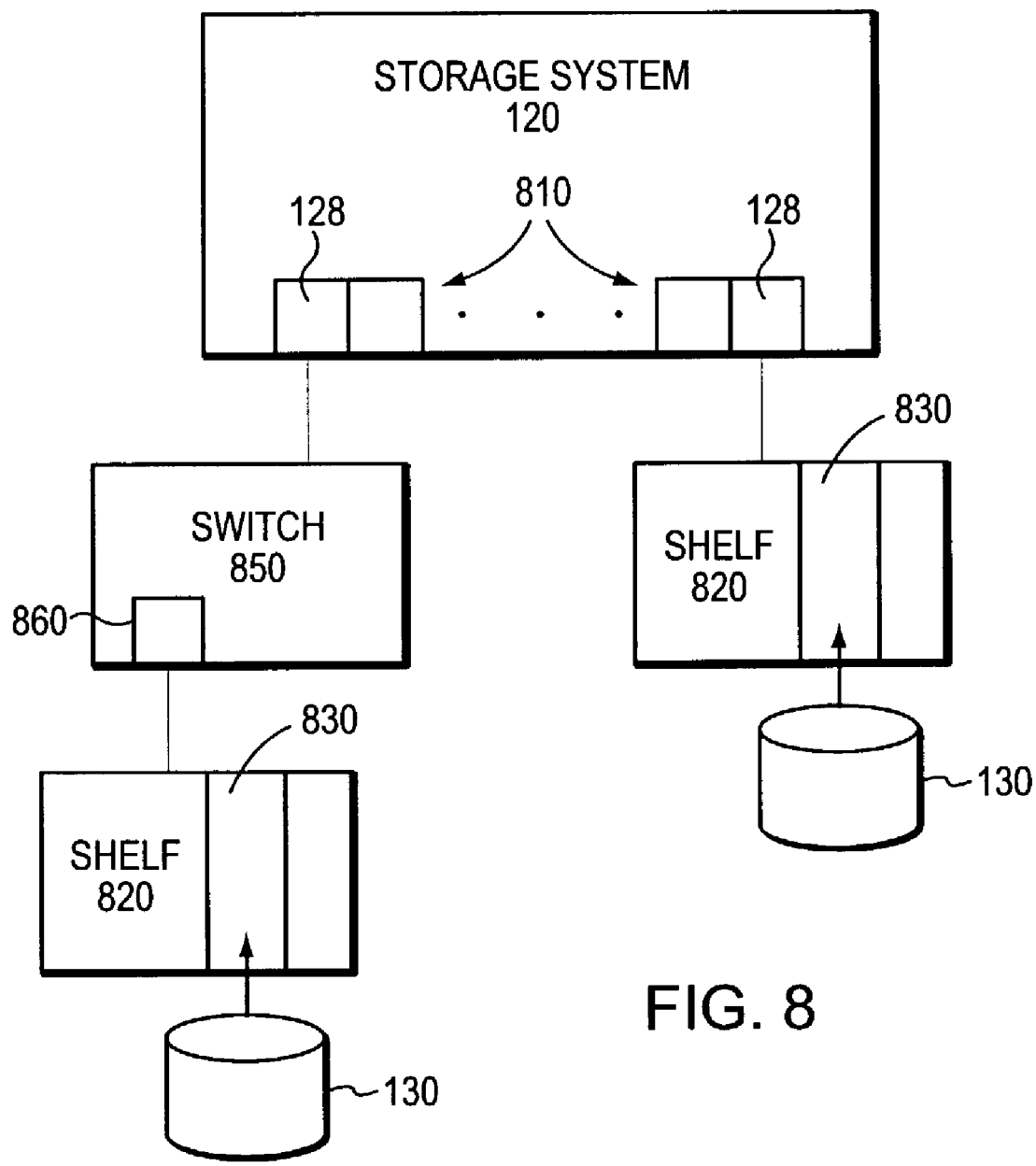
FIG. 8 is a schematic diagram illustrating the concept of physical locality with respect to disks coupled to the storage system of FIG. 1.

According to the present invention, the query-based spares management technique comprises an attribute-based disk selection procedure that includes an aspect of maintaining locality in RAID groups. Here, "locality" denotes physical locality in terms of electrical connectivity for purposes of fault isolation and/or increasing aggregate bandwidth to the volume as represented by connections to individual disks. FIG. 8 is a schematic diagram illustrating the aspect of physical locality with respect to disks 130 coupled to the storage system 120, wherein each disk 130 has locality criteria associated with its physical and electrical connectivity to the storage system. In the case of a direct-attached disk configuration, the locality criteria are directed to adapter connectivity, e.g., a slot 810 on a backplane, such as a peripheral computer interconnect (PCI) backplane, of the system bus 125 that can accommodate two storage adapters, the storage adapter 128, a disk shelf 820 and a slot 830 on the shelf. For a switch-attached disk configuration, the locality criteria further include switch connectivity, e.g., a switch 850 coupled between the storage system and disk, along with a port 860 on the switch.

Yet, there are other attributes-based selection criteria that may be used in the process of disk selection, including disk size and checksum type. Locality can thus be generalized as one type of attribute that is considered when selecting disks from a spare pool. Another type of attribute is "policy"; the configuration tree has a policy associated with it such that, e.g., a mirrored volume implies pair-wise disk selection. Note that the mechanisms described herein work generally with N-way mirroring. Another policy consideration may be the type of RAID implementation, e.g., a RAID-4 level implementation. The policy attributes associated with a configuration tree, along with the locality attribute, cooperate to provide an attribute set that may be used to determine the disks selected in response to the select-query request to add disks to a RAID group of a volume.

To that end, the locality attribute may be further extended to the use of policies that enables identification of the spare pools from which disks are selected. In addition to adapter/switch connectivity, these policies may include locality criteria such as the location of a disk shelf, e.g., a location that is remote from the storage system for disaster recovery purposes. If there is more than one spare pool in a storage system, it may be desirable to select disks from a spare pool that is "local" to that plex. For example, in the case of a plex of a non-mirrored volume located in a particular geographical area, the technique attempts to select disks from a spare pool in that area. If another plex is added from another geographical area to create a mirrored volume, the technique attempts to select disks from a spare pool in that other area.

Figure 9:
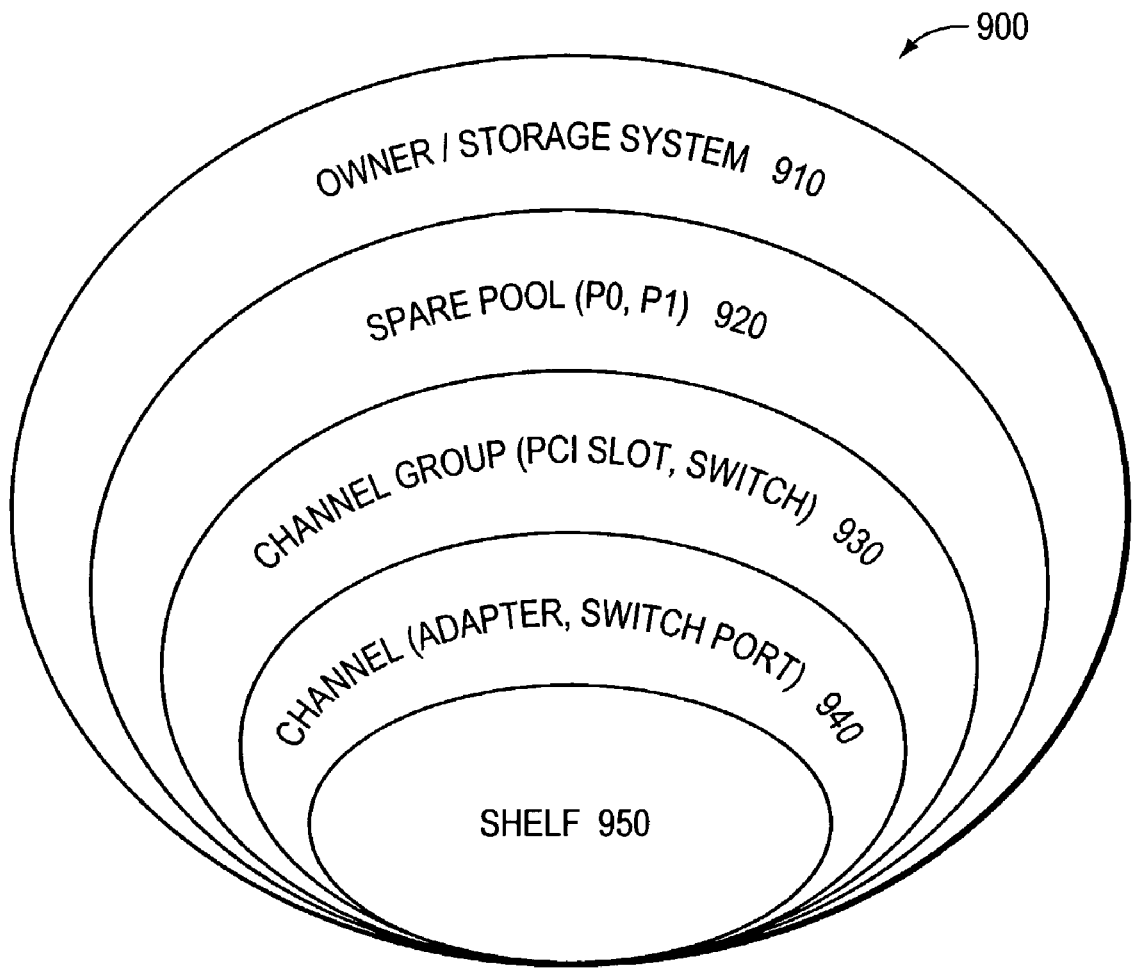
FIG. 9 is a schematic diagram illustrating an onion used to express a locality attribute of a query-based spares management technique of the present invention.

FIG. 9 is a schematic diagram illustrating an "onion" 900 used to express the locality attribute in a flexible manner to thereby enable a reasonable disk selection choice for a particular configuration context. The onion 900 comprises a plurality of layers that cooperate to provide a containment relationship of connectivity extending from an outer layer to an inner layer. The outer layer 910 of the onion pertains to ownership of the spare pools by the storage system (in the case of CFO storage system arrangement, a filer or its partner); this represents the broadest grouping of the disks. A next layer 920 pertains to a more specific grouping by spare pool; each storage system illustratively owns two spare pools (P0, P1) in the case of a mirrored volume and one spare pool (P0) in the case of a non-mirrored volume.

A finer grouping of disks is by a "channel grouping" layer 930, an example of which is a PCI slot on the backplane of the storage system. As noted, in the illustrative embodiment, a PCI slot 810 can support two storage adapters 128. Whereas a PCI slot is an example of a channel group in the direct-attached disk configuration, a switch is an example of the channel grouping in the switch-attached disk configuration. A yet finer grouping of disks is by a channel layer 940, which expresses a connection to the disk. In the case of a switch-attached disk, the channel refers to a port on the switch, whereas in the case of a direct-attached disk, the channel represents an adapter on the storage system. A last or inner layer 950 pertains to a shelf on which the disks are located.

The onion is used to progress towards a finer granularity with respect to the locality attribute in the determination of a disk selection decision. The layers of locality in the onion reflect the connectivity associated with disks in a storage system; if new interconnect technologies are used, the layers of locality in the onion may change. If a locality criterion represented by a layer of the onion is not achievable, then the novel technique progresses to a next outer layer of granularity in order to satisfy the disk request in a reasonable manner. Note also that some of these locality criteria may be included within various objects of the configuration tree as policies maintained by those objects. For example, the RAID group object may maintain a policy of locality criteria associated with the disks in its RAID group. However, for a mirrored volume, the policy associated with locality for replacement of a disk may be stored in a plex object, given the pair-wise selection constraint of a mirrored volume.

According to another aspect of the invention, the attribute set for the query-based spares management technique comprises a plurality of steps, each of which may have an associated element of policy. These elements of policy cooperate to produce a fine granularity of disk selection. One element of policy may be directed to priority ordering of disk attributes considered during disk selection. Another element of policy pertains to locality wherein, as noted, locality denotes electrical connectivity for purposes of fault isolation or increasing aggregate bandwidth to the volume through connections to the disks. Other elements of policy may pertain to disk selection and allocation attributes, including disk addition and disk replacement policies, each of which is associated with a volume (volume object of the configuration tree). Each volume (volume object) of the storage system may have an attribute set that is different from other volumes in the storage system. Moreover, the attribute set described herein is preferably "dynamic" and thus can change.

Figure 10:
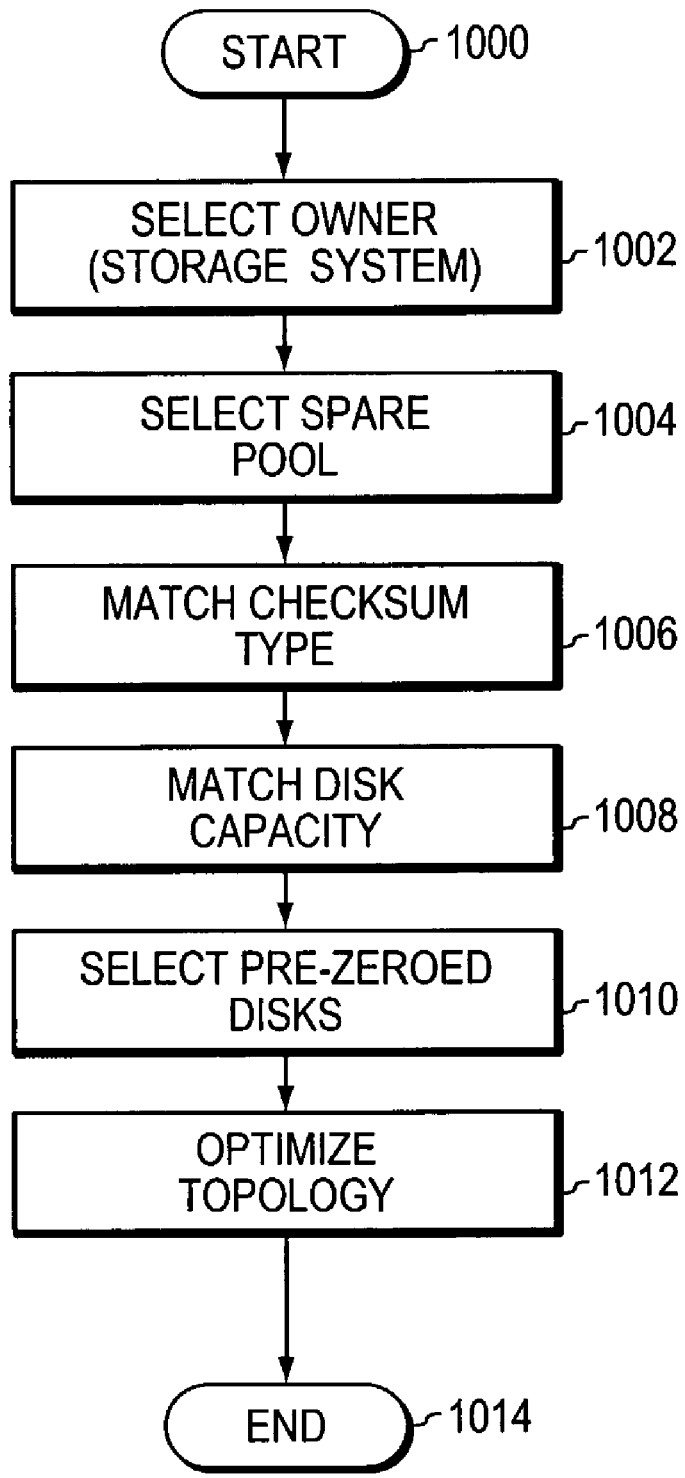
FIG. 10 is a flowchart illustrating a sequence of steps used to implement the query-based spares management technique of the present invention.

FIG. 10 is a flowchart illustrating a sequence of steps used to implement the query-based spares management technique of the present invention. The steps of the sequence represent elements of policy enforced by the backend of the storage operating system 200 in response to, e.g., the illustrative vol add command. These steps comprise an iterative process in that if a first choice selection is not met, the process backs up to a previous step. The sequence starts at Step 1000 and proceeds to Step 1002 where a first element of policy pertains to selection of the owner (storage system) that owns the spare pools of disks. In Step 1004, a next element of policy pertains to selection of a spare pool within the storage system. In the illustrative example of a mirrored volume shown in FIG. 7, fault isolation may be preserved by ensuring that disks selected for plex p0 originate from spare pool P0, while disks selected for plex p1 originate from pool P1.

In accordance with selection priority ordering, the next elements of policy are not concerned with locality but rather with other disk attributes. For example, Step 1006 illustrates a next element of policy directed to matching the checksum type of disks selected in accordance with the first two steps. The checksum type (512, 520 blocks per sector) is metadata provided on a per volume basis. As a result of this step, only those disks that match the checksum type are selected. Step 1008 of the technique pertains to selecting disks on the basis of disk capacity, which includes matching the capacity of disks already in the RAID group, along with a geometry constraint associated with pair-wise matching of disks with similar capacity to plexes of a mirrored volume.

In general, capacity matching involves matching the usable capacity of disks added to each plex, which may be accomplished through the use of "downsizing". The disk capacity policy may be manifested as a select-query request to the disk event thread 350 for a list of all disks at various sizes that have previously met the other criteria. The SQA manager 750 returns an ordered list of disks by size. The DISKADD object then determines whether a pair of similarly sized disks can be obtained from the list of those disks. As a result of this step, a finer selection of disks is achieved.

Step 1010 of the sequence gives preference to disks that are prepared for immediate incorporation into a volume, such as pre-zeroed disks (versus disks that require zeroing or other pre-incorporation activity). It should be noted that after each Step 1004-1010, the SQA manager generates a count summary report. If the report indicates that the number of remaining candidates matches or exceeds the DISKADD request, then the sequence proceeds to the next step. Otherwise, the sequence returns to a previous step and repeats with modified selection criteria.

Step 1012 of the technique pertains to an element of locality related to topology optimization. This optimization step is performed by the SQA manager, based upon policy, such as a default locality or preferred locality associated with the volume or plex. The inner layers of the onion, contained with the spare pool layer, represent the locality criteria utilized for this optimization. In essence, this last step gives an ordering to the disks remaining after the iterative process based on optimizing for topology (connectivity). For example, the remaining disks may be ordered to effect an alternating storage adapter arrangement. Here, disks are allocated one RAID group at a time, with the goal of alternating the parity disk connectivity to the adapter across all RAID groups. In sum, the topology optimization is based on the onion 900 and is performed by, e.g., the configuration thread 310 prior to allocating the selected disks in response to the disk addition (vol add) command. The sequence then ends at Step 1014 with disk allocation.

A preferred embodiment of the invention has been described herein with reference to a file server having a storage operating system with a file system layer and a RAID subsystem (among other components), which manages file semantics in order to access data organized in files. It should be understood, however, that the invention can be practiced in any system or device that selects disks to be added to one or more RAID groups of a volume. One type of system or device in which the invention can be embodied is designed to perform a data storage function, and if so, may perform data-related operations, e.g., in response to data access requests. Such requests may use file-based and/or block-based semantics, depending on the implementation and, correspondingly, the system or device may organize data in files or in another manner. Moreover, such systems and devices may or may not incorporate features and functions described herein, such as, for example, a file system layer or a RAID subsystem, or may combine or otherwise modify their operation, without departing from the principles of the invention. Finally, the invention has been described herein using nomenclature such as "DMGR" which may appear to be specific to implementations of the invention providing RAID functionality; however, the invention in its broader sense is not so limited.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. In addition, it is understood that the data structures described herein can include additional information while remaining within the scope of the present invention. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for managing storage devices in a computer system, comprising:
   maintaining a pool of a plurality of spare storage devices;
   receiving a command to add a storage device from the pool to a RAID group of storage devices, wherein the RAID group is within a volume;
   evaluating a topology of underlying physical storage devices of a configuration tree of the volume, wherein the topology is evaluated by an object of the configuration tree;
   determining, based on the evaluation of the configuration tree topology, one or more attributes that are desired to a configuration of the RAID group;
   forming, based on the attributes that are desired, one or more attribute-based query requests;
   providing a count of each spare storage device from the pool that satisfies each attribute-based query request;
   selecting one or more best storage devices from the count; and
   allocating the one or more best storage devices to the RAID group of storage devices.

2. The method of claim 1, further comprising:
   ordering of storage device attributes according to priority of a policy rule.

3. The method of claim 2, wherein storage device addition is as an element of the policy rule.

4. The method of claim 1, further comprising:
   allocating the one or more best storage devices in response to an operator-initiated request to add storage devices to the volume.

5. The method of claim 1, further comprising:
   allocating the one or more best storage devices in response to a demand-driven request resulting from a requirement imposed by a storage system to add storage devices to the volume.

6. The method of claim 2, wherein locality is an element of the policy rule, and wherein the locality denotes electrical connectivity for increasing aggregate bandwidth to the volume through storage device connections.

7. The method of claim 2, wherein storage device replacement is an element of the policy rule.

8. The method of claim 1, further comprising:
   initiating selection of a user specified storage device for addition to a specific volume by an operator initiated request.

9. The method of claim 1, further comprising:
   selecting any of one or more storage devices for addition to a specific volume by an operator-initiated request.

10. The method of claim 1, further comprising:
    determining, by a select-query-allocate (SQA) manager, which storage device of the plurality of spare storage devices best satisfies one or more policy rules to add to the RAID group of storage devices.

11. The method of claim 1, further comprising:
    selecting two storage devices for a minor operation.

12. The method of claim 1, further comprising:
    selecting two storage devices for a minor operation from separate sub-pools of the pool of the plurality of spare storage devices.

13. The method of claim 1, wherein the object of the configuration tree comprises an attribute set.

14. The method of claim 1, further comprising:
    reading a volume attribute set from the volume, the volume defining an overall logical arrangement of storage device space, the volume attribute set defining requirements of the volume.

15. The method of claim 1, further comprising:
    embodying a select-query-allocate application programming interface as code between one or more objects of the configuration tree.

16. The method of claim 1, further comprising:
    embodying an object of the pool of the plurality of spare storage devices as a spare storage device manager object.

17. The method of claim 1, further comprising:
    executing a storage device add function to add the one or more best storage devices to the RAID group of storage devices.

18. The method of claim 1, further comprising:
    cooperating by a storage device add function with a select-query-allocate (SQA) application programming interface (API) and an associated SQA manager process to determine the one or more best storage devices to add to the RAID group of storage devices.

19. The method of claim 1, further comprising:
optimizing an order in which the one or more best storage devices are allocated from the pool of the plurality of spare storage devices.

20. The method of claim 1, further comprising:
maintaining a policy mechanism with changeable fine-grained elements of policy to provide one or more policy rules for assessing parameters of one or more of the spare storage devices from the pool.

21. The method of claim 1, further comprising:
forwarding, by a select-query-allocate application programming interface to a select-query-allocate manager, the attribute-based query request.

22. The method of claim 21, further comprising:
forwarding the attribute-based query request to a spare storage device manager.

23. The method of claim 1, wherein at least one storage device is configured as a disk.

24. A computer system, comprising:
a pool of a plurality of spare storage devices;
a command configured to add a storage device to a RAID group;
a selection process configured to evaluate a topology of underlying physical storage devices of a configuration tree of a volume;
the computer system configured to determine desired attributes of a selected number of spare storage devices in the pool of the plurality of spare storage devices, the computer system further configured to assess the desired attributes of the selected number of spare storage devices based on the evaluation of the configuration tree topology;
the computer system further configured to form, based on the desired attributes, one or more attribute-based query requests;
a software process configured to determine, based on the evaluation of the configuration tree topology, that a particular spare storage device from the pool of the plurality of spare storage devices is a best storage device to add to the RAID group;
the software process further configured to select the best storage device in response to the software process determining the best storage device; and
the software process further configured to add the best storage device to the RAID group.

25. The computer system of claim 24, further comprising:
storage device attributes ordered according to priority as one or more policy rules.

26. The computer system of claim 25, wherein storage device addition is an element of the policy rules.

27. The computer system of claim 24, further comprising:
a storage operating system configured to execute the selection process in response to an operator-initiated request to add one or more storage devices to the RAID group.

28. The computer system of claim 24, further comprising:
a storage operating system configured to execute the selection process in response to a demand-driven request to add one or more storage devices to the RAID group.

29. The computer system of claim 25, wherein locality is an element of the policy rules, the locality denoting electrical connectivity for increasing aggregate bandwidth to the volume through connections to one or more storage devices.

30. The computer system of claim 24, wherein storage device replacement is an element of the policy rules.

31. The computer system of claim 24, further comprising:
selection of a user specified storage device for addition to a specific RAID group initiated by an operator request.

32. The computer system of claim 24, further comprising:
one or more storage devices selected for addition to a specific RAID group by an operator initiated request.

33. The computer system of claim 24, further comprising:
a select-query-allocate manager configured to determine the best storage device to add to the RAID group.

34. The computer system of claim 24, further comprising:
two storage devices selected for a minor operation.

35. The computer system of claim 24, further comprising:
two storage devices selected for a minor operation, the two storage devices selected from separate sub-pools of the pool of the plurality of spare storage devices.

36. The computer system of claim 24, further comprising:
a select-query-allocate application programming interface configured as code between one or more objects of the configuration tree.

37. The computer system of claim 24, further comprising:
a volume attribute set, the volume defining an overall logical arrangement of storage device space, the volume attribute set defining requirements of the volume.

38. The computer system of claim 24, further comprising:
an object of the pool of the plurality of spare storage devices configured as a spare storage device manager object.

39. The computer system of claim 24, further comprising:
a select-query-allocate application programming interface configured to forward the one or more attribute-based query requests to a select-query-allocate manager.

40. The computer system of claim 24, further comprising:
a storage device add function configured to add the best storage device to the RAID group.

41. The computer system of claim 24, further comprising:
a storage device add function configured to cooperate with a select-query-allocate (SQA) application programming interface (API) and an associated SQA manager process to determine the best storage device to add to the RAID group.

42. The computer system of claim 24, further comprising:
software executed by the computer system configured to optimally order a list of the storage devices in which the storage devices are allocated from the pool of the plurality of spare storage devices.

43. The computer system of claim 24, further comprising:
a policy mechanism maintained with changeable fine-grained elements of policy to provide one or more policy rules for assessing the attributes of the spare storage devices.

44. The computer system of claim 24, further comprising:
a spare storage device manager object configured to receive the attribute-based query request.

45. The computer system of claim 24, further comprising:
an object of the configuration tree configured as an attribute set.

46. The computer system of claim 24, further comprising:
select-query-allocate manager configured to narrow down choices of the storage devices of the pool of the plurality of spare storage devices.

47. A computer readable medium containing executable program instructions executed by a processor, comprising:
program instructions that maintain a pool of a plurality of spare storage devices;
program instructions that receive a command to add a storage device from the pool to a RAID group, wherein the RAID group is within a volume;

program instructions that evaluate a topology of underlying physical storage devices of a configuration tree of the volume, wherein the topology is evaluated by an object of the configuration tree;

program instructions that determine, based on the evaluation of the configuration tree topology, one or more attributes that are desired to a configuration of the RAID group;

program instructions that form, based on the attributes that are desired, one or more attribute-based query requests;

program instructions that provide a count of one or more of each spare storage device from the pool that satisfies one or more of each attribute-based query request;

program instructions that select one or more best storage devices; and program instructions that allocate the one or more best storage devices to the RAID group.

48. The computer readable medium of claim 47, further comprising:

program instructions that order storage device attributes according to priority of a policy rule.

49. The computer readable medium of claim 48, wherein storage device addition is an element of the policy rule.

50. The computer readable medium of claim 47, further comprising:

program instructions that allocate the one or more best storage device in response to an operator-initiated request to add storage devices to the volume.

51. The computer readable medium of claim 47, further comprising:

program instructions that allocate the one or more best storage devices in response to a demand-driven request resulting from a requirement imposed by a storage system to add storage devices to the volume.

52. The computer readable medium of claim 48, wherein locality is as an element of the policy rule, and wherein the locality denotes electrical connectivity for increasing aggregate bandwidth to the volume through storage device connections.

53. The computer readable medium of claim 48, wherein storage device replacement is as an element of the policy rule.

54. The computer readable medium of claim 47, further comprising:

program instructions that initiate selection of a user specified storage device for addition to a specific volume by an operator initiated request.

55. The computer readable medium of claim 47, further comprising:

selecting any of one or more storage devices for addition to a specific volume by an operator-initiated request.

56. The computer readable medium of claim 48, further comprising:

program instructions that determine, by a select-query-allocate manager, which storage device of the plurality of spare storage devices best satisfies the policy rules to add to the group of storage devices.

57. The computer readable medium of claim 47, further comprising:

program instructions that select two storage devices for a mirror operation.

58. The computer readable medium of claim 47, further comprising:

program instructions that select two storage devices for a mirror operation from separate sub-pools of the pool of the plurality of spare storage devices.

59. The computer readable medium of claim 47, wherein the object of the configuration tree comprises an attribute set.

60. The computer readable medium of claim 47, further comprising:

program instructions that read a volume attribute set from the volume, the volume defining an overall logical anangement of storage device space, the volume attribute set defining requirements of the volume.

61. The computer readable medium of claim 47, further compnsing:

program instructions that embody a select-query-allocate application programming interface as a layer of code between one or more objects of the configuration tree.

62. The computer readable medium of claim 47, further comprising:

program instructions that embody an object of the pool of the plurality of spare storage devices as a spare storage device manager object.

63. The computer readable medium of claim 47, further comprising:

program instructions that execute a storage device add function to add the one or more best storage devices to the RAID group of storage devices.

64. The computer readable medium of claim 47, further comprising:

program instructions that cooperate by a storage device add function with a select-query-allocate application programming interface and an associated select-query-allocate manager process to determine the one or more best storage devices to add to the RAID group of storage devices.

65. The computer readable medium of claim 47, further comprising:

program instructions that optimize an order in which the one or more best storage devices are allocated from the pool of the plurality of spare storage devices.

66. The computer readable medium of claim 47, further comprising:

program instructions that aintain a policy mechanism with changeable fine-grained elements of policy to provide one or more policy rules for assessing parameters of one or more of each spare storage devices from the pool.

67. The computer readable medium of claim 47, further comprising:

program instructions that forward, by a select-query-allocate application programming interface to a select-query-allocate manager, the attribute-based query request.

68. The computer readable medium of claim 47, further comprising:

program instructions that forward the attribute-based query request to a spare storage device manager object.

69. The computer readable medium of claim 47, wherein the command is generated by a user.

70. The computer readable medium of claim 47, further comprising:

using a data storage disk as the data storage device.

71. The computer readable medium of claim 47, further comprising:

using video tape as the storage devices.

72. The computer readable medium of claim 47, further comprising:

using optical storage media as the storage devices.

73. The computer readable medium of claim 47, further comprising:

using DVD media as the storage devices.

74. The computer readable medium of claim 47, further comprising:
  using magnetic tape as the storage devices.

75. The computer readable medium of claim 47, further comprising:
  using bubble memory as the storage devices.

76. The computer readable medium of claim 47, further comprising:
  using electronic random access memory as the storage devices.

77. The computer readable medium of claim 47, further comprising:
  using micro electrical mechanical media as the storage devices.

78. The method of claim 1, wherein a data storage disk is used as the storage device.

79. The method of claim 1, wherein a video tape is used as the storage device.

80. The method of claim 1, wherein an optical storage media is used as the storage device.

81. The method of claim 1, wherein a DVD media is used as the storage device.

82. The method of claim 1, wherein a magnetic tape is used as the storage device.

83. The method of claim 1, wherein bubble memory is used as the storage device.

84. The method of claim 1, wherein an electronic random access memory is used as the storage device.

85. The method of claim 1, wherein a micro electrical mechanical media used as the storage device.

* * * * *

UNITED STATES PATENT AND TRADEMARK OFFICE
CERTIFICATE OF CORRECTION

| | | |
|---|---|---|
| PATENT NO. | : 7,664,913 B2 | Page 1 of 1 |
| APPLICATION NO. | : 10/394819 | |
| DATED | : February 16, 2010 | |
| INVENTOR(S) | : Cassell et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 449 days.

Signed and Sealed this

Seventh Day of December, 2010

David J. Kappos
*Director of the United States Patent and Trademark Office*